US012567233B2

(12) United States Patent (10) Patent No.: US 12,567,233 B2
Guyduy (45) Date of Patent: Mar. 3, 2026

(54) USING ACTIVATION MAPS TO DETECT BEST AREAS OF AN IMAGE FOR PREDICTION OF NOISE LEVELS

(71) Applicant: CANON U.S.A., INC., Melville, NY (US)

(72) Inventor: Yevgeniy Gennadiy Guyduy, Bellmore, NY (US)

(73) Assignee: Canon U.S.A., Inc., Melville, NY (US)

( * ) Notice: Subject to any disclaimer, the term of this patent is extended or adjusted under 35 U.S.C. 154(b) by 409 days.

(21) Appl. No.: 18/035,719

(22) PCT Filed: Nov. 8, 2021

(86) PCT No.: PCT/US2021/058453
§ 371 (c)(1),
(2) Date: May 5, 2023

(87) PCT Pub. No.: WO2022/099133
PCT Pub. Date: May 12, 2022

(65) Prior Publication Data
US 2023/0401821 A1 Dec. 14, 2023

Related U.S. Application Data

(60) Provisional application No. 63/111,284, filed on Nov. 9, 2020.

(51) Int. Cl.
*G06V 10/764* (2022.01)
*G06T 7/00* (2017.01)
(Continued)

(52) U.S. Cl.
CPC .......... *G06V 10/764* (2022.01); *G06T 7/0002* (2013.01); *G06V 10/25* (2022.01); *G06V 20/70* (2022.01); *G06T 2207/20132* (2013.01)

(58) Field of Classification Search
CPC ...... G06V 10/764; G06V 10/25; G06V 20/70; G06V 10/778; G06V 10/82; G06T 7/0002;
(Continued)

(56) References Cited

U.S. PATENT DOCUMENTS 7,813,583 B2 10/2010 Yoo et al.
8,908,989 B2 12/2014 Geisler et al.
(Continued)

FOREIGN PATENT DOCUMENTS

EP 1309185 A1 5/2003
JP 4463341 B2 5/2010
(Continued)

OTHER PUBLICATIONS

Jli, J. et al., "Towards Noise-resistant Object Detection with Noisy Annotations", Mar. 3, 2020, pp. 1-17.
(Continued)

*Primary Examiner* — Xuemei G Chen
(74) *Attorney, Agent, or Firm* — Canon U.S.A., Inc., IP Division

(57) ABSTRACT
An image processing apparatus is provided which obtains and provides image data at a first scale as input to a first classifier trained based on images in the first scale to classify the image data in a first class or a second class, outputs, from the first classifier, activation map data and image array data, obtains at least target region of the image data at the first scale based on output of a second classifier that uses the activation map data and image array data from the first classifier, maps the at least one target region to image data at a second scale, extracts target region image data from each of the at least one target region of the image data at the second scale and classifies, as a first type of image or a second type of image.

12 Claims, 36 Drawing Sheets

(51) Int. Cl.
G06V 10/25 (2022.01)
G06V 20/70 (2022.01)

(58) Field of Classification Search
CPC . G06T 2207/20132; G06T 2207/20084; G06T 2207/20081; G06T 2207/30168; G06T 7/00; G06F 18/217; G06F 18/2431
See application file for complete search history.

(56) References Cited

U.S. PATENT DOCUMENTS

| | | | |
|---|---|---|---|
| 9,224,068 B1* | 12/2015 | Ranzato | G06F 18/28 |
| 10,043,243 B2 | 8/2018 | Mativychuk et al. | |
| 10,664,966 B2 | 5/2020 | Guo et al. | |
| 10,810,721 B2 | 10/2020 | Mech et al. | |
| 2007/0165112 A1 | 7/2007 | Shinmei et al. | |
| 2010/0182461 A1 | 7/2010 | On | |
| 2017/0228616 A1* | 8/2017 | Tasdizen | G06F 18/24765 |
| 2019/0042888 A1* | 2/2019 | Tsutsui | G06V 10/82 |
| 2019/0080456 A1* | 3/2019 | Song | G06T 7/174 |
| 2019/0228519 A1* | 7/2019 | Guo | G06T 7/001 |
| 2019/0286940 A1* | 9/2019 | Shen | G06T 11/60 |
| 2019/0340462 A1* | 11/2019 | Pao | G06V 10/82 |
| 2020/0226744 A1 | 7/2020 | Cohen et al. | |
| 2020/0234080 A1 | 7/2020 | Ciller Ruiz et al. | |
| 2020/0294201 A1 | 9/2020 | Planche et al. | |
| 2020/0327360 A1 | 10/2020 | Samala | |
| 2021/0012194 A1* | 1/2021 | Laskaridis | G06N 3/0495 |
| 2021/0383530 A1* | 12/2021 | Peleg | G06V 10/454 |
| 2023/0343068 A1* | 10/2023 | Yao | G06N 3/08 |
| 2024/0037747 A1* | 2/2024 | Raedt | G06V 20/70 |

FOREIGN PATENT DOCUMENTS

| | | |
|---|---|---|
| JP | 5594665 B2 | 9/2014 |
| KR | 101538353 B1 | 7/2015 |

OTHER PUBLICATIONS

Xu, R. et al., "Ensemble with estimation: seeking for optimization in class noisy data", International Journal of Machine Learning and Cybernetics (2020), Jun. 12, 2019, pp. 231-248, vol. 11.

* cited by examiner

Figure 5A:
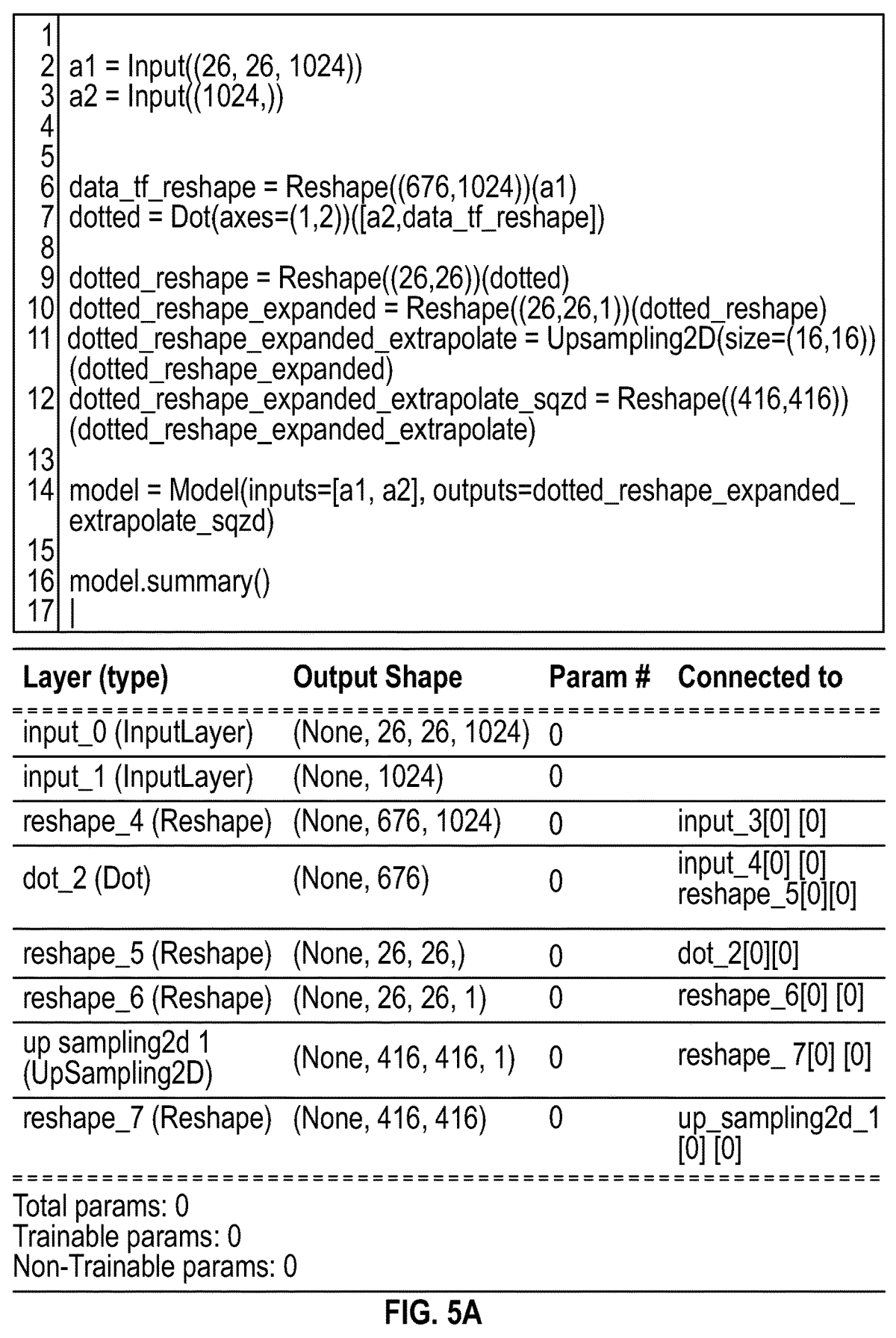

```
1
2  a1 = Input((26, 26, 1024))
3  a2 = Input((1024,))
4
5
6  data_tf_reshape = Reshape((676,1024))(a1)
7  dotted = Dot(axes=(1,2))([a2,data_tf_reshape])
8
9  dotted_reshape = Reshape((26,26))(dotted)
10 dotted_reshape_expanded = Reshape((26,26,1))(dotted_reshape)
11 dotted_reshape_expanded_extrapolate = Upsampling2D(size=(16,16))
   (dotted_reshape_expanded)
12 dotted_reshape_expanded_extrapolate_sqzd = Reshape((416,416))
   (dotted_reshape_expanded_extrapolate)
13
14 model = Model(inputs=[a1, a2], outputs=dotted_reshape_expanded_
   extrapolate_sqzd)
15
16 model.summary()
17 |
```

| Layer (type) | Output Shape | Param # | Connected to |
|---|---|---|---|
| input_0 (InputLayer) | (None, 26, 26, 1024) | 0 | |
| input_1 (InputLayer) | (None, 1024) | 0 | |
| reshape_4 (Reshape) | (None, 676, 1024) | 0 | input_3[0] [0] |
| dot_2 (Dot) | (None, 676) | 0 | input_4[0] [0]<br>reshape_5[0][0] |
| reshape_5 (Reshape) | (None, 26, 26,) | 0 | dot_2[0][0] |
| reshape_6 (Reshape) | (None, 26, 26, 1) | 0 | reshape_6[0] [0] |
| up sampling2d 1 (UpSampling2D) | (None, 416, 416, 1) | 0 | reshape_ 7[0] [0] |
| reshape_7 (Reshape) | (None, 416, 416) | 0 | up_sampling2d_1 [0] [0] |

Total params: 0
Trainable params: 0
Non-Trainable params: 0

ResNet 50 ImageNet Pre-trained 28 Layers / 2 Blocks w/o vs w/t Batchnorm 4 random    Structured    Stitched    Center 4 scores    3 scores    1 score    1 score Accuracy Score : 0.7972769518165692
Report :

|  | precision | recall | f1-score | support |
|---|---|---|---|---|
| 0 | 0.79 | 0.80 | 0.80 | 506 |
| 1 | 0.80 | 0.80 | 0.80 | 520 |
| accuracy |  |  | 0.80 | 1026 |
| macro avg | 0.80 | 0.80 | 0.80 | 1026 |
| weighted avg | 0.80 | 0.90 | 0.90 | 1026 |

Centered

Accuracy Score : 0.8274853801169959
Report :

|  | precision | recall | f1-score | support |
|---|---|---|---|---|
| 0 | 0.84 | 0.81 | 0.82 | 506 |
| 1 | 0.82 | 0.85 | 0.83 | 520 |
| accuracy |  |  | 0.83 | 1026 |
| macro avg | 0.83 | 0.83 | 0.83 | 1026 |
| weighted avg | 0.83 | 0.83 | 0.83 | 1026 |

Random

Accuracy Score : 0.834387902202720
Report :

|            | precision | recall | f1-score | support |
|------------|-----------|--------|----------|---------|
| 0          | 0.83      | 0.84   | 0.83     | 506     |
| 1          | 0.84      | 0.83   | 0.84     | 520     |
|            |           |        |          |         |
| accuracy   |           |        | 0.83     | 1026    |
| macro avg  | 0.83      | 0.83   | 0.83     | 1026    |
| weighted avg | 0.83    | 0.83   | 0.83     | 1026    |

Fig. 13D
Structured

Accuracy Score : 0.820662768031891
Report :

|            | precision | recall | f1-score | support |
|------------|-----------|--------|----------|---------|
| 0          | 0.82      | 0.82   | 0.82     | 506     |
| 1          | 0.83      | 0.82   | 0.82     | 520     |
|            |           |        |          |         |
| accuracy   |           |        | 0.82     | 1026    |
| macro avg  | 0.82      | 0.82   | 0.82     | 1026    |
| weighted avg | 0.82    | 0.82   | 0.82     | 1026    |

Fig. 13E
Stitched

Accuracy Score : 0.8940155945419104
Report :

|            | precision | recall | f1-score | support |
|------------|-----------|--------|----------|---------|
| 0          | 0.89      | 0.89   | 0.89     | 506     |
| 1          | 0.90      | 0.89   | 0.90     | 520     |
|            |           |        |          |         |
| accuracy   |           |        | 0.89     | 1026    |
| macro avg  | 0.89      | 0.89   | 0.89     | 1026    |
| weighted avg | 0.89    | 0.89   | 0.89     | 1026    |

Fig. 13F
Activation
map Regions

USING ACTIVATION MAPS TO DETECT BEST AREAS OF AN IMAGE FOR PREDICTION OF NOISE LEVELS

CROSS-REFERENCE TO RELATED APPLICATIONS

This application is a National Phase application of International Application No. PCT/US2021/058453, filed Nov. 8, 2021, which claims the benefit of priority from U.S. Provisional Patent Application Ser. No. 63/111,284 filed on Nov. 9, 2020, the entirety of both applications are hereby incorporated by reference.

BACKGROUND

Field

The present disclosure describes an improved technique for predicting noise images using activation maps from a convolutional neural network.

Description of Related Art

After photographs are taken photographers often examine images for various quality aspects. One common image quality metric is noise. By reviewing the noise that appears in an image it is decided whether the image is of good quality and is a candidate for printing or to be kept, or if that image needs additional post processing or should be deleted. Currently there are various methods that exist for detection of noise in images including but not limited to median or mean sliding windows or differential gradient estimations as well as detection and de-noising of images using convolutional neural networks. Most of these methods perform relatively well on images with very high levels of noise where it also often appears universally thought out the image. Most methods listed above are also focused on detection of artificial type of noise that can be modelled artificially such as Gaussian, log-normal, uniform, exponential, Poisson, salt and pepper, Rayleigh, speckle and Erlang By experimenting with internal real world images it has been found that artificial noise does not represent noise that's typically embedded in the image at the time of capture and, often times, is not found universally throughout the image. Additionally, depending on the type of camera used, noise in images can follow different distribution patterns. Another drawback associated with some of the aforementioned noise detection techniques is that given processing speed requirements they are typically performed using resized images. However, the same experimentation using real world images have showed that resizing of images greatly reduces or completely destroys image noise making prediction less accurate or impossible. One viable solution which has shown to remedy above shortcomings is to use targeted crop or multiple crops where noise is most likely to be present from original non resized image.

SUMMARY

According to an embodiment, an apparatus and method is provided which remedies the above drawbacks by determining and identifying one or more target patches within one or more images which is provided as input to a first classifier trained using image capture device data from a plurality of different image capture devices for estimating noise to advantageously estimate and obtain the best area within images to be used for predicting noise and which predicts whether the image is noisy or non-noisy based on the identified patch or patches According to an embodiment, an image processing method and apparatus is provided which obtains image data stored in memory of a processing device, providing the image data at a first scale as input to a first classifier, the first classifier being trained based on images in the first scale to classify the image data in a first class or a second class, outputs, from the first classifier, activation map data and image array data, obtains at least target region of the image data at the first scale based on output of a second classifier that uses the activation map data and image array data from the first classifier, maps the at least one target region to image data at a second scale, extracts target region image data from each of the at least one target region of the image data at the second scale and classifies, as a first type of image or a second type of image. the obtained image based on the extracted target region image data using a third classifier trained using cropped image data at the second scale to estimate noise.

In another embodiment, the classifying, as a first type or second type of image is performed by calculating an average by predicted class of each of the at least one target regions over an entire area of the obtained image data; and labeling the obtained image as the first type or second type based on the calculated average.

In another embodiment, obtaining at least one target region further comprises identifying coordinate locations within the obtained image based on the image array data and the activation map such that each of the target region represents a maximum value and extracting target region image data further comprises using each of the identified coordinate locations as a center point; and generating a bounding box having a predetermine size around each center point; and extracting, as the target region image data, the image data within each generated bounding box.

In another embodiment, the obtained image including the label identifying the image as the first type of image or the second type of image is output on a display wherein the first type of image is an image classified as noisy and the second type of image is an image classified as non-noisy.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF THE DRAWINGS

FIGS. 5A-5B illustrate a second exemplary model for use by the algorithm according to the present disclosure.

FIG. 7 illustrates the identification of a target patch within the image for use by the algorithm according to the present disclosure.

FIGS. 13A-13F provide data comparing the algorithm according to the present disclosure with other estimation results.

Figure 1:
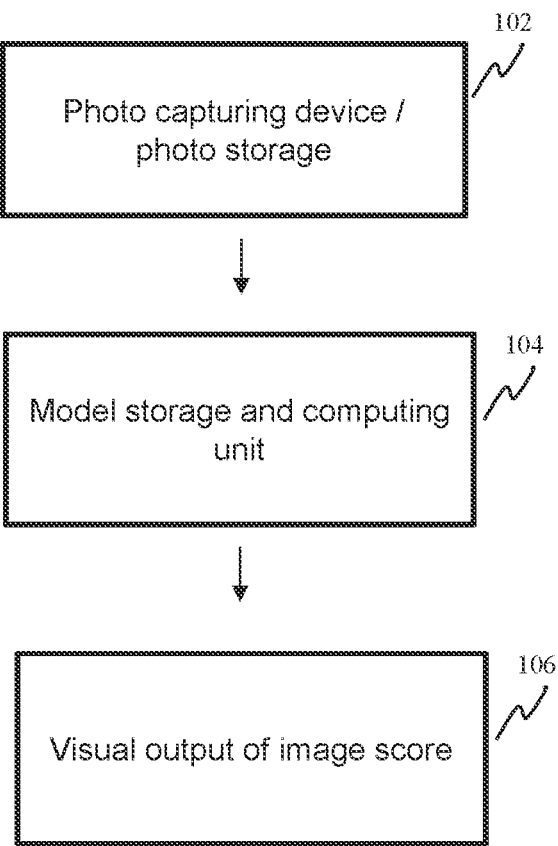
FIG. 1 is flow diagram of an image scoring algorithm of the present disclosure.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

Exemplary embodiments of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment and, according to the Figures and embodiments described below, embodiments described can be applied/performed in situations other than the situations described below as examples.

The present disclosure describes an improved technique for predicting noise in images using a convolutional neural network which is provided, as input, non-resized areas of images that were selected using another, different, convolutional neural network and its activations map values.

FIG. 1 shows a photo scoring system. FIG. 1 shows a photo scoring system and algorithm for scoring images based on detected noise. An image capture device is shown in 102. The image capture device 102 may be a camera or other device that has a camera integral therewith such as a smartphone. The image capture device 102 includes processing circuitry and optical elements to capture images thereon and store the capture images in a storage of device

102. In other embodiments, the device 102 may be an image repository such as a cloud storage whereby previously captured images are stored and from where those images can be retrieved for further image processing according to the algorithms described herein. Estimation apparatus 104 is provided and receives images that have been captured by device 102. The estimation apparatus 104 includes one or more processors that execute stored instructions for performing estimation processing that estimates noise in the image being processed and then assigns a quality score to the image based on the result of the estimation processing. A display 106 is provided such that the quality score indicator is controlled to be displayed on display 106. This provides a visual representation of a quality of an image based on the estimated noise contained therein.

Figure 2:
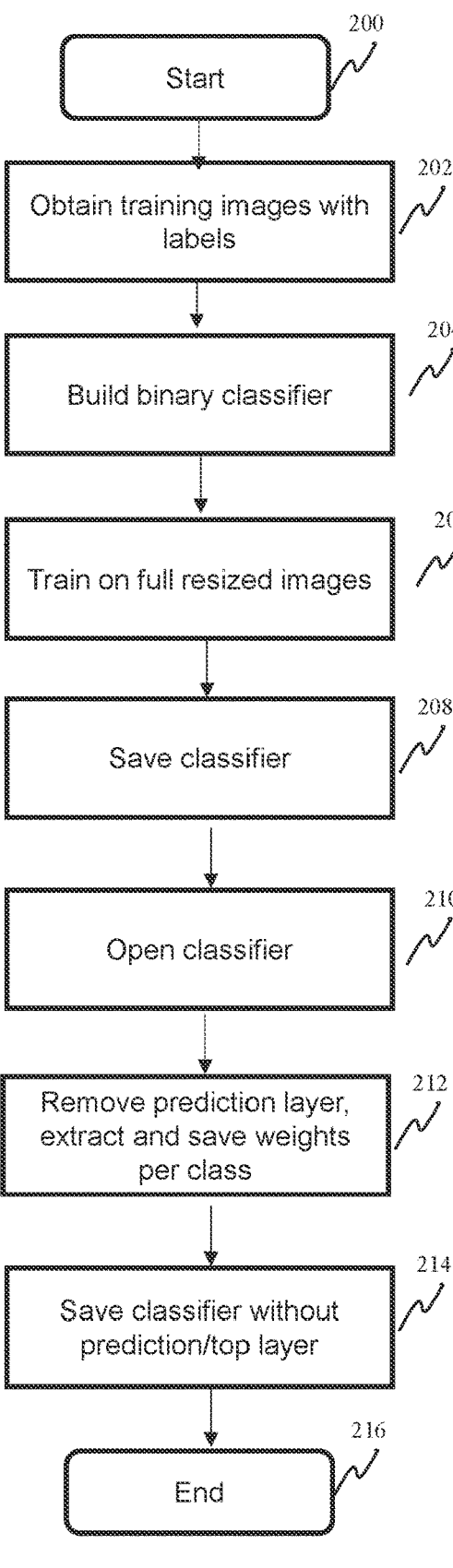
FIG. 2 is flow diagram of an image scoring algorithm of the present disclosure.

FIG. 2 Shows the process of building a classifier using resized images in order to estimate best areas for predicting noise in an image. These areas are then scaled back to original image size, cropped and fed into another convolutional neural network trained on patches obtained from noisy and non noisy non resized images.

Figure 6:
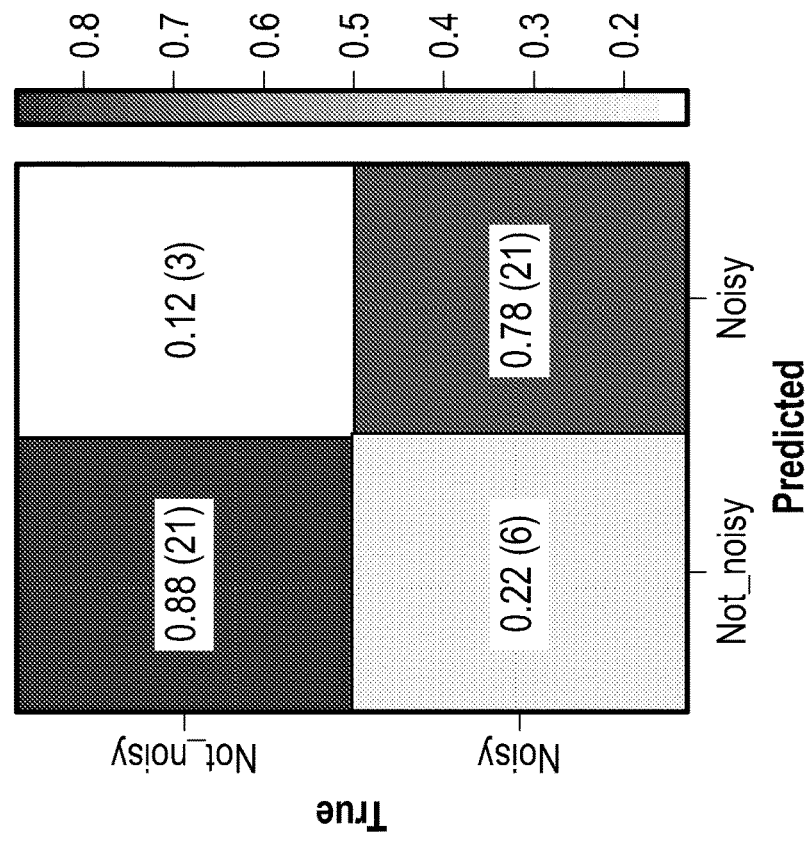
FIG. 6 is a graphical representation of the training accuracy associated with the models according to the present disclosure.
Figure 6:
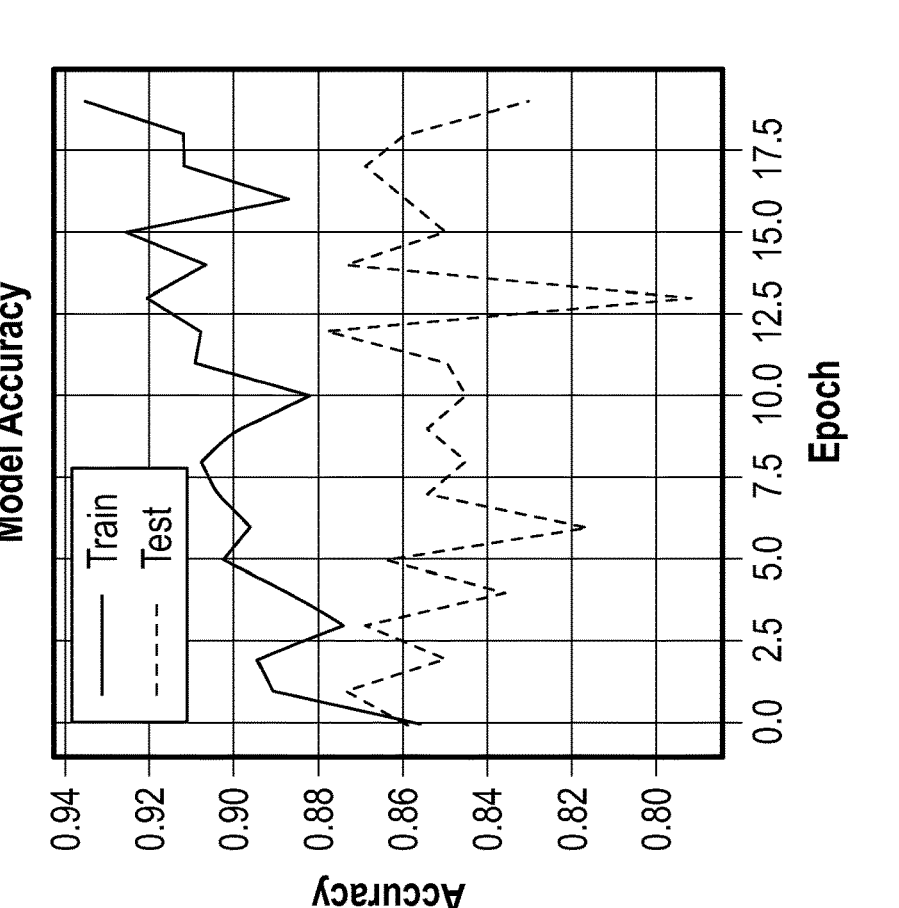

The algorithm of FIG. 2 begins at step 200. In step 202, a set of training data comprising first images and labels for each image are obtained. These training images are represented as 302 in FIG. 3. The labeled training images includes a plurality of images labeled as noisy and images labeled as non-noisy. These training images serve as the basis for the classifier to be trained. In step 204, convolutional neural network is utilized as a binary classifier to perform model training, which takes original images, resizes them and uses this data to train model's weight. In one embodiment, the classifier consist of first 28 layers/first 2 blocks of a pre trained network pre trained on a pre-labeled dataset and tuned with internal dataset using transfer learning technique with a global average pooling layer and a dense layer with 2 softmax units added in order to allow the model to classify between two classes. Since noise is typically random, the first few blocks of the model were able to use previously learned high level features to estimate noise levels up to a certain accuracy threshold and all other layers past layer 28 were discarded. Thereafter, the transfer learning training process is applied using internal dataset and which unfreezes all batch normalization layers (technique, which thru experimentation has proved to increase model accuracy) and last added layers described above for training what is at this stage is a fully convolutional classifier. In step 206, training is performed for a few epochs using resized images. The model is able to reduce error during first few epochs but starts to overfit fast after since the amount of information about noise has been altered by resizing procedures. FIG. 6 depicts training accuracy progress. As can be seen from FIG. 6, while one can observe that the model is prone to overfitting nevertheless it learns a certain amount of information and achieves well above random guess accuracy. This information is what will guide the selection of best crop. In step 208, a classifier achieving best accuracy on validation dataset based on the accuracy being above a predetermined accuracy threshold is saved into memory. This first trained model is represented as 304 in FIG. 3. In step 210, the saved classifier is read back into memory and, in step 212, previously added layers are removed and weights (previously limited information learned) of last dense layers are stored for use in producing activations maps that depict best area within an image for predicting noise. Or areas where noise is most likely to appear. In step S214, classifier without the prediction layer or the previously added layers is saved in memory. FIGS. 4A-4I shows resulting first model that outputs data for mapping activation maps back to resized image size. This is shown as 306 in FIG. 3. The training processing ends at step 216.

Figure 5B:
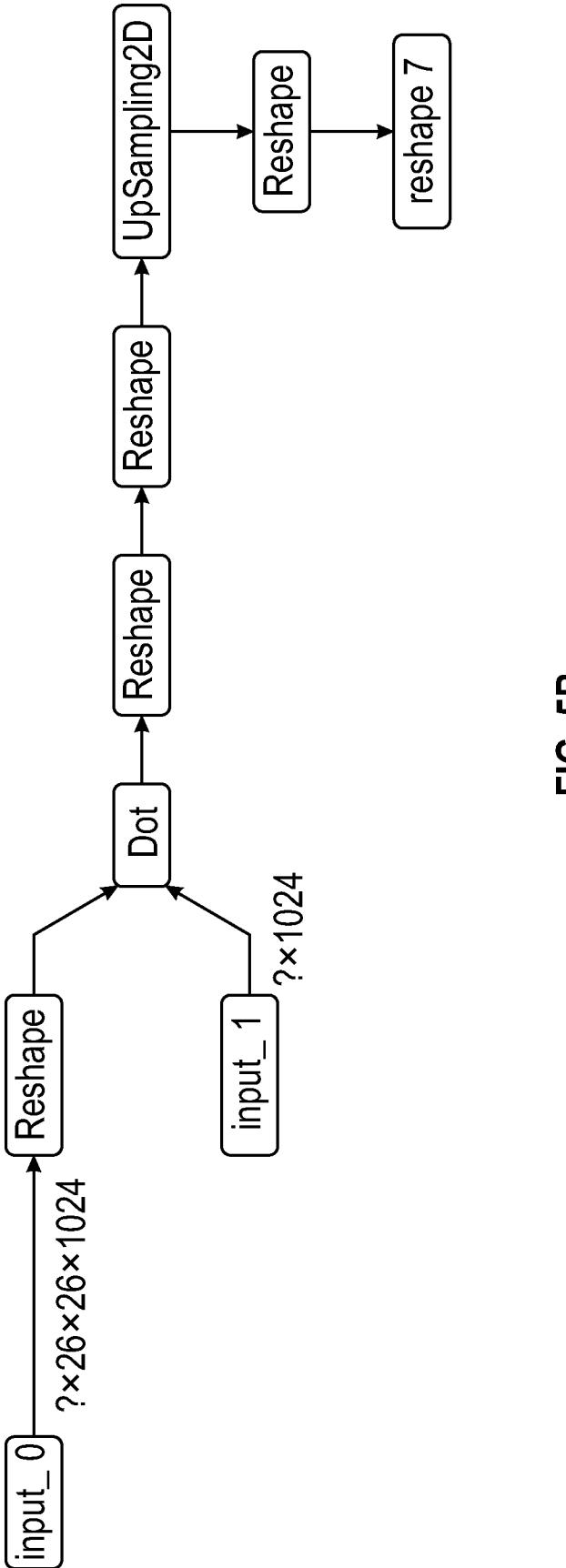

FIGS. 5A & 5B illustrate a second neural network mentioned and its associated structure which is used to rescale first model's output (activation maps) in order to project it back to image size with possibility to overlay this resulting one dimensional array over an image that was put thru the network and get top activation maps and their locations in the image. This network takes 1 array (307 in FIG. 3) of previously saved weight from last dense layer, in this case one corresponding to label 1 or noisy image class and another input from first network in a form of 1024 activation maps of size 26×26 (306 in FIG. 3) and performs needed transformations. The resulting output is a one-dimensional array of originally resized image size (308 in FIG. 3), in this case 416×416, with its highest values depicting areas that allow model to distinguish noisy images.

Figure 3:
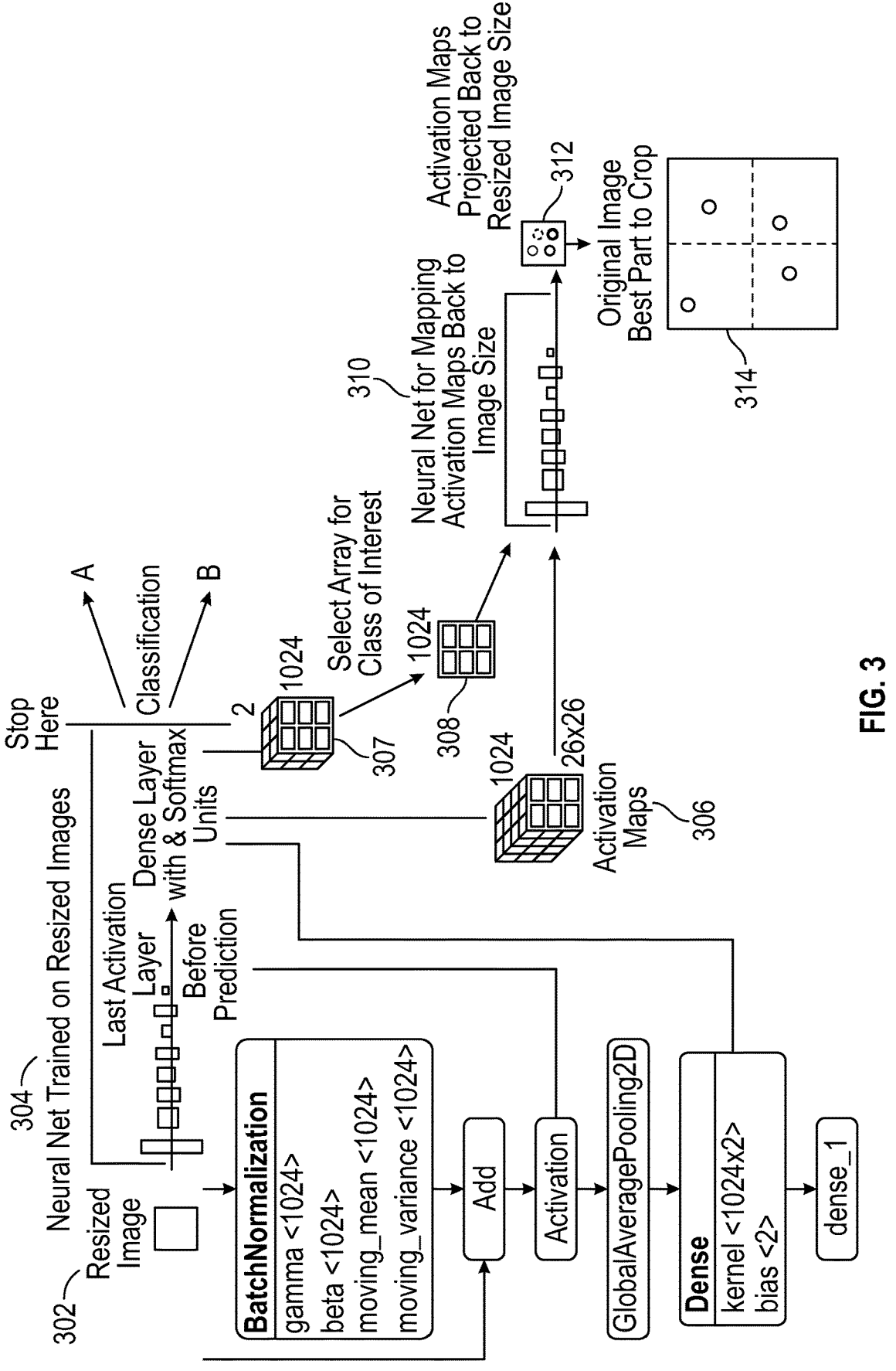
FIG. 3 is an illustrative view of the image scoring algorithm of the present disclosure.
Figure 4A:
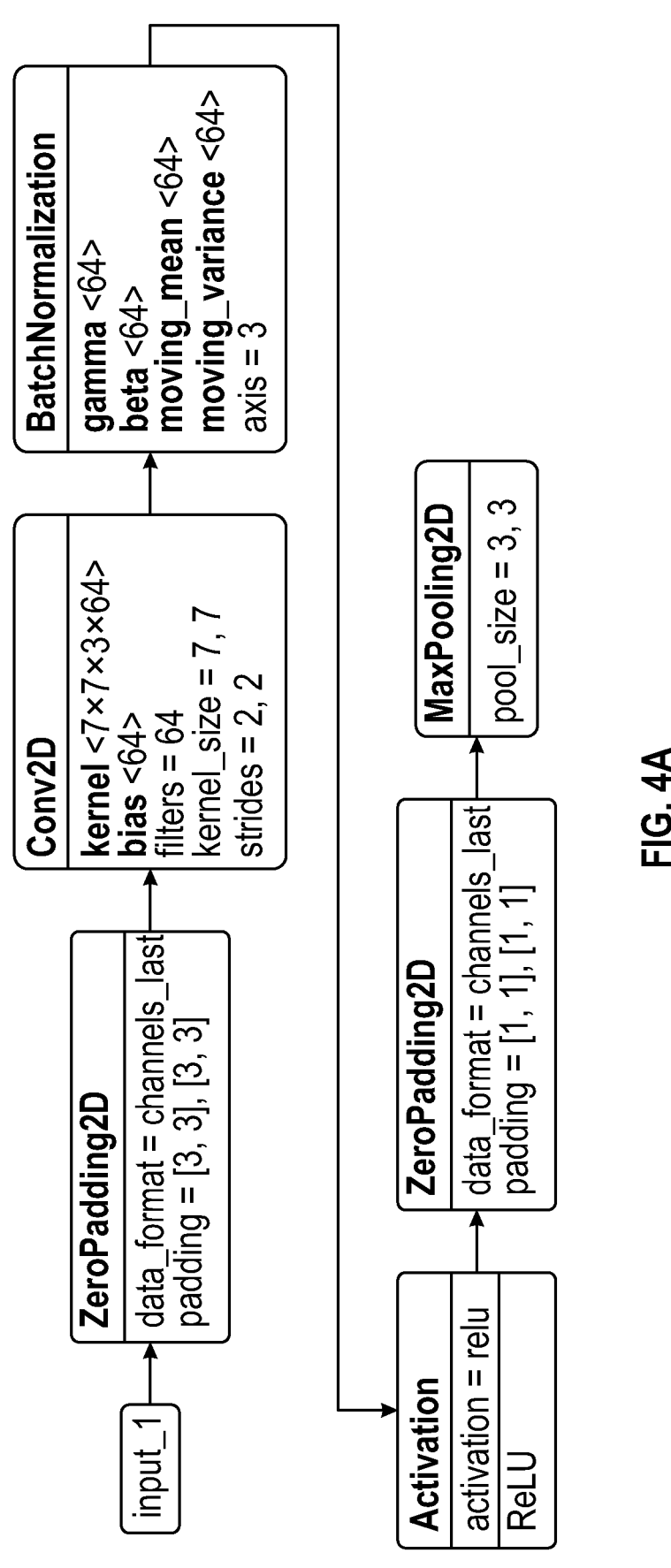
FIGS. 4A-4J illustrate a first exemplary model for use by the algorithm according to the present disclosure.
Figure 4B:
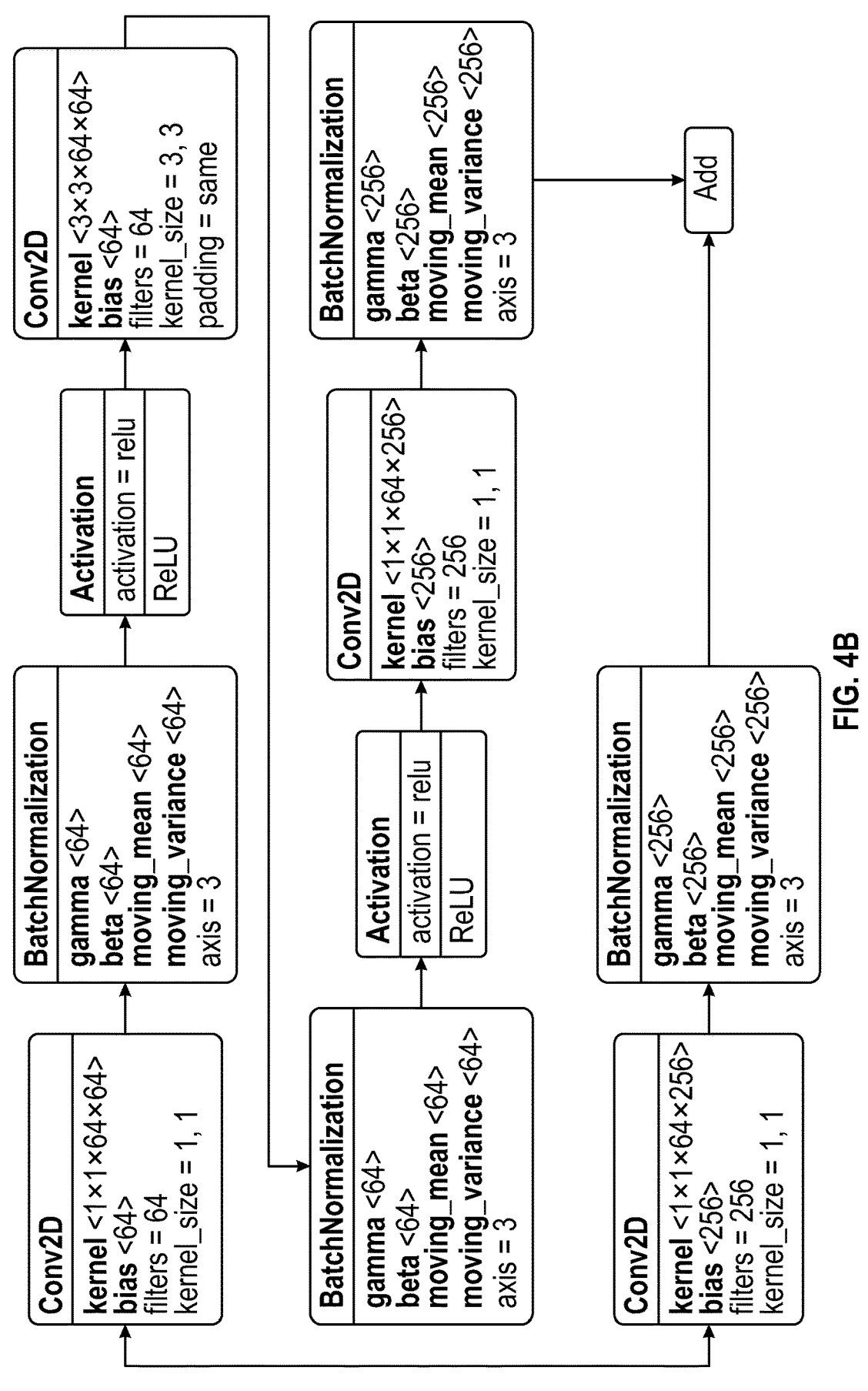
Figure 4C:
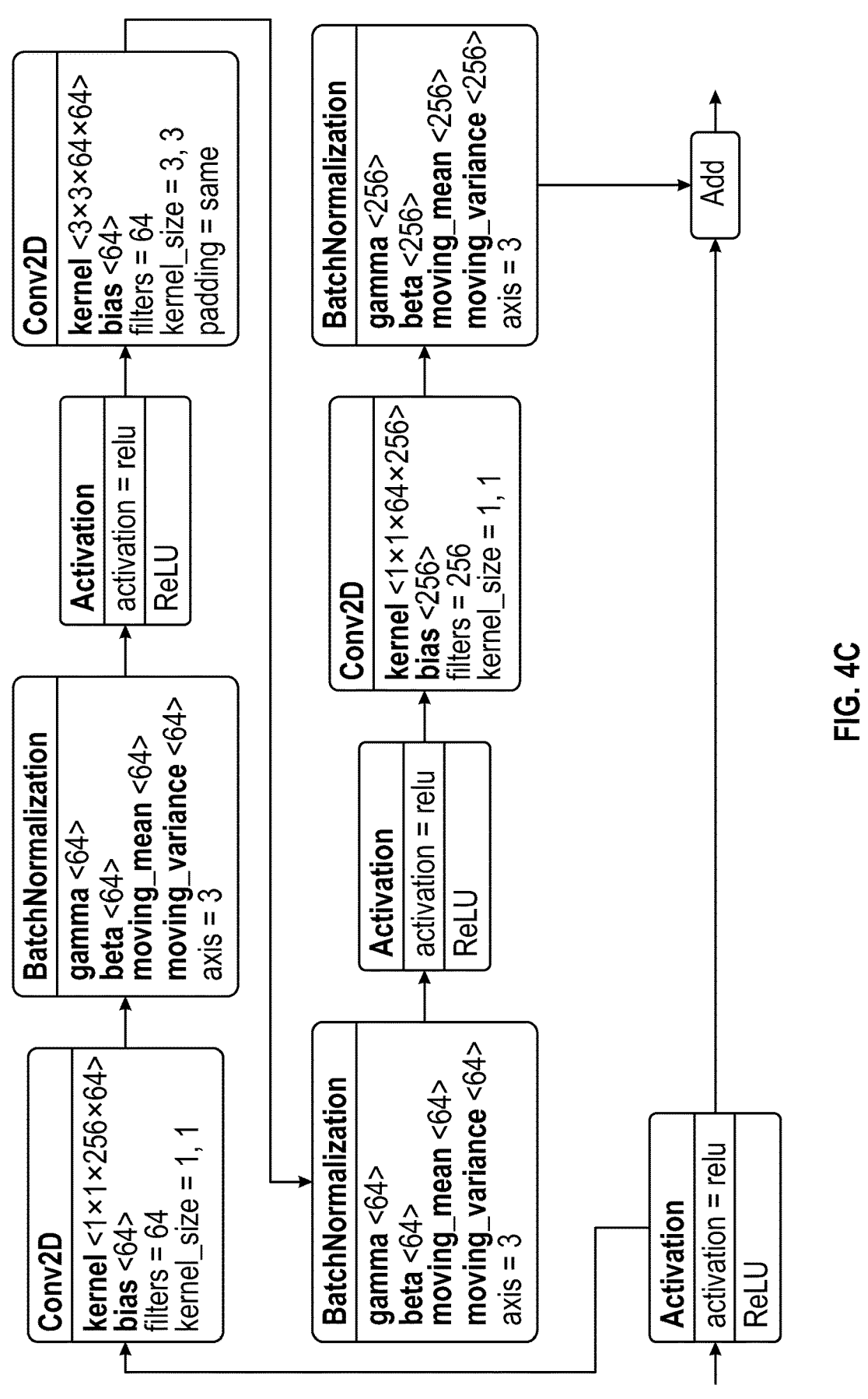
Figure 4D:
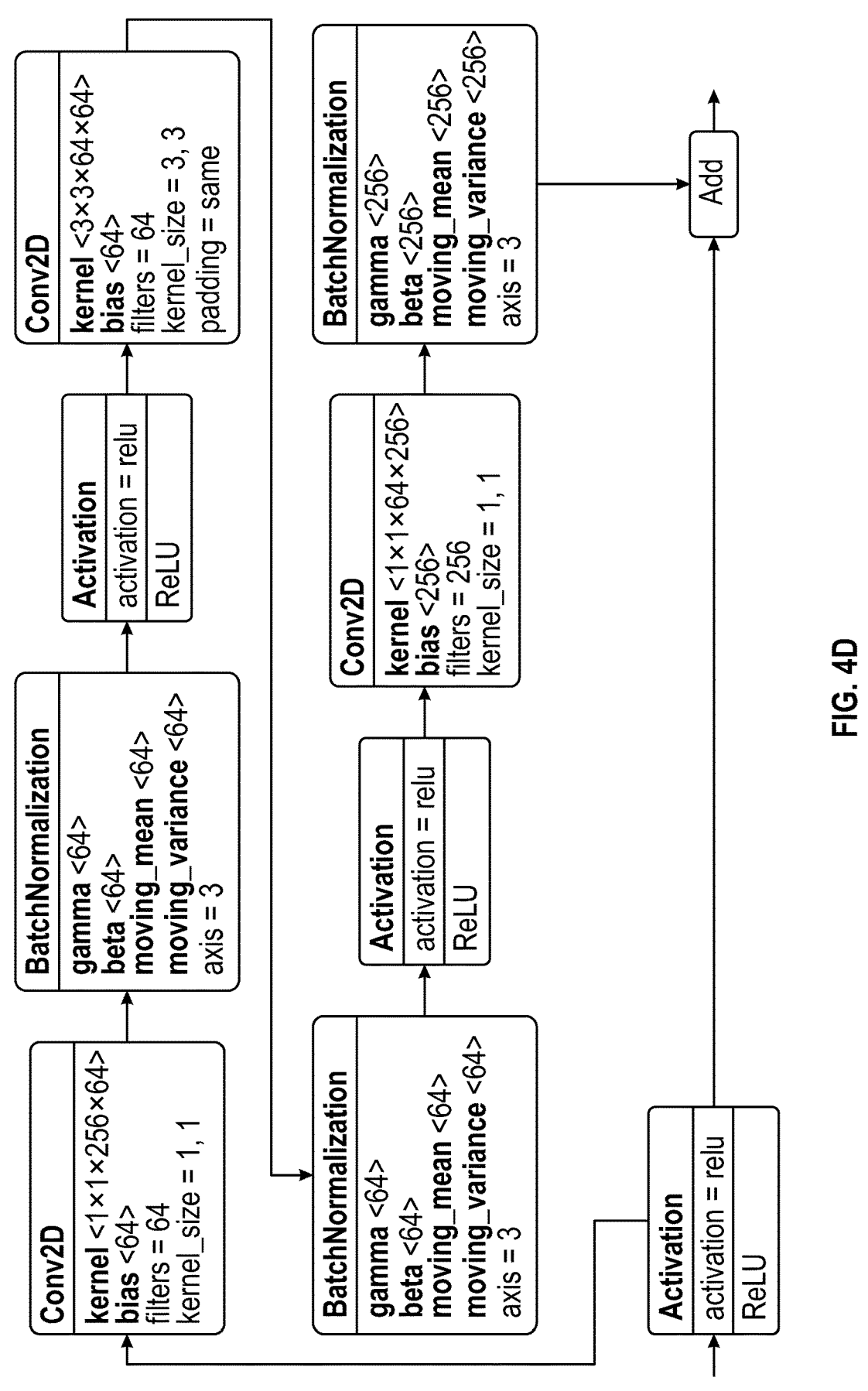
Figure 4E:
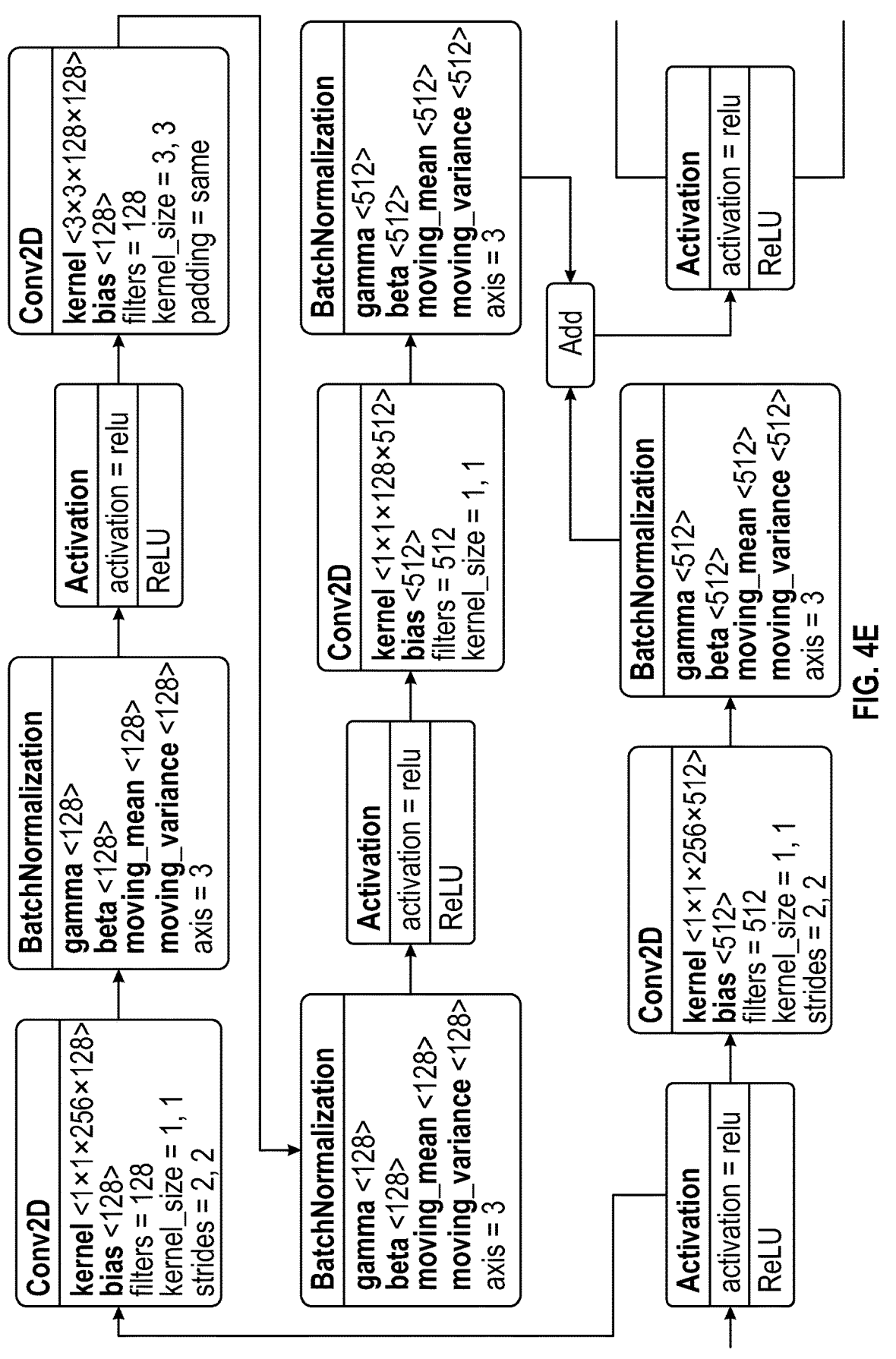
Figure 4F:
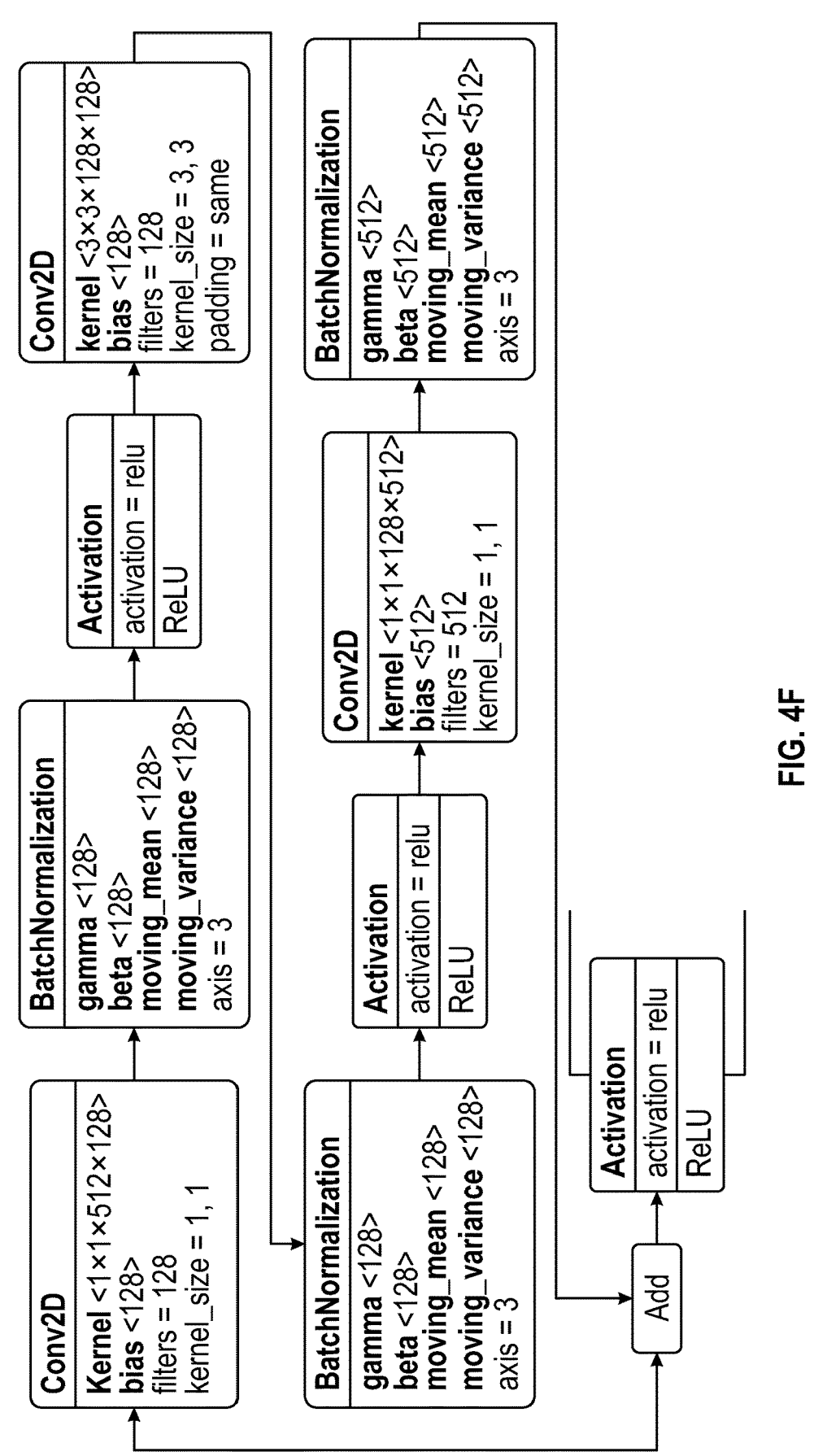
Figure 4G:
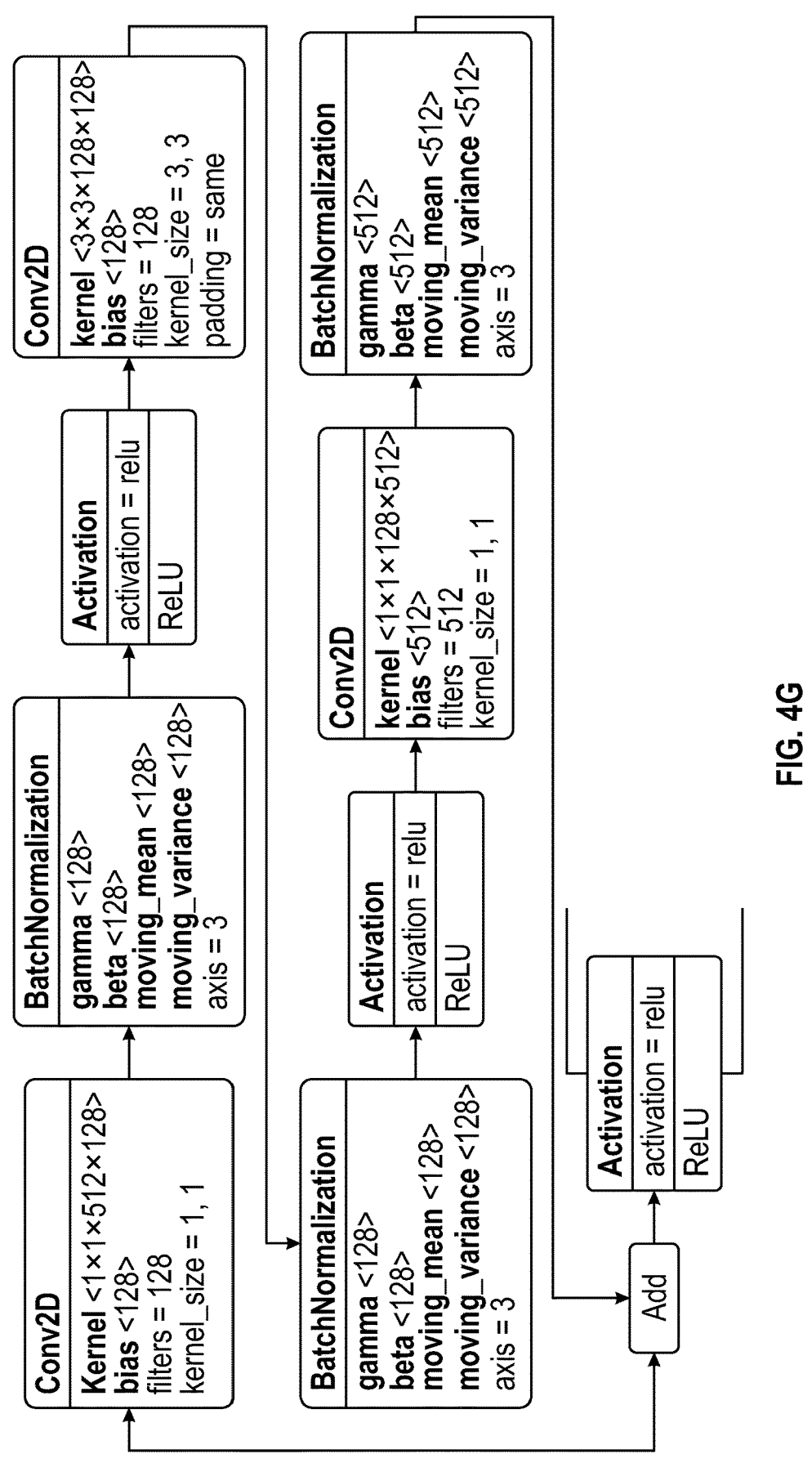
Figure 4H:
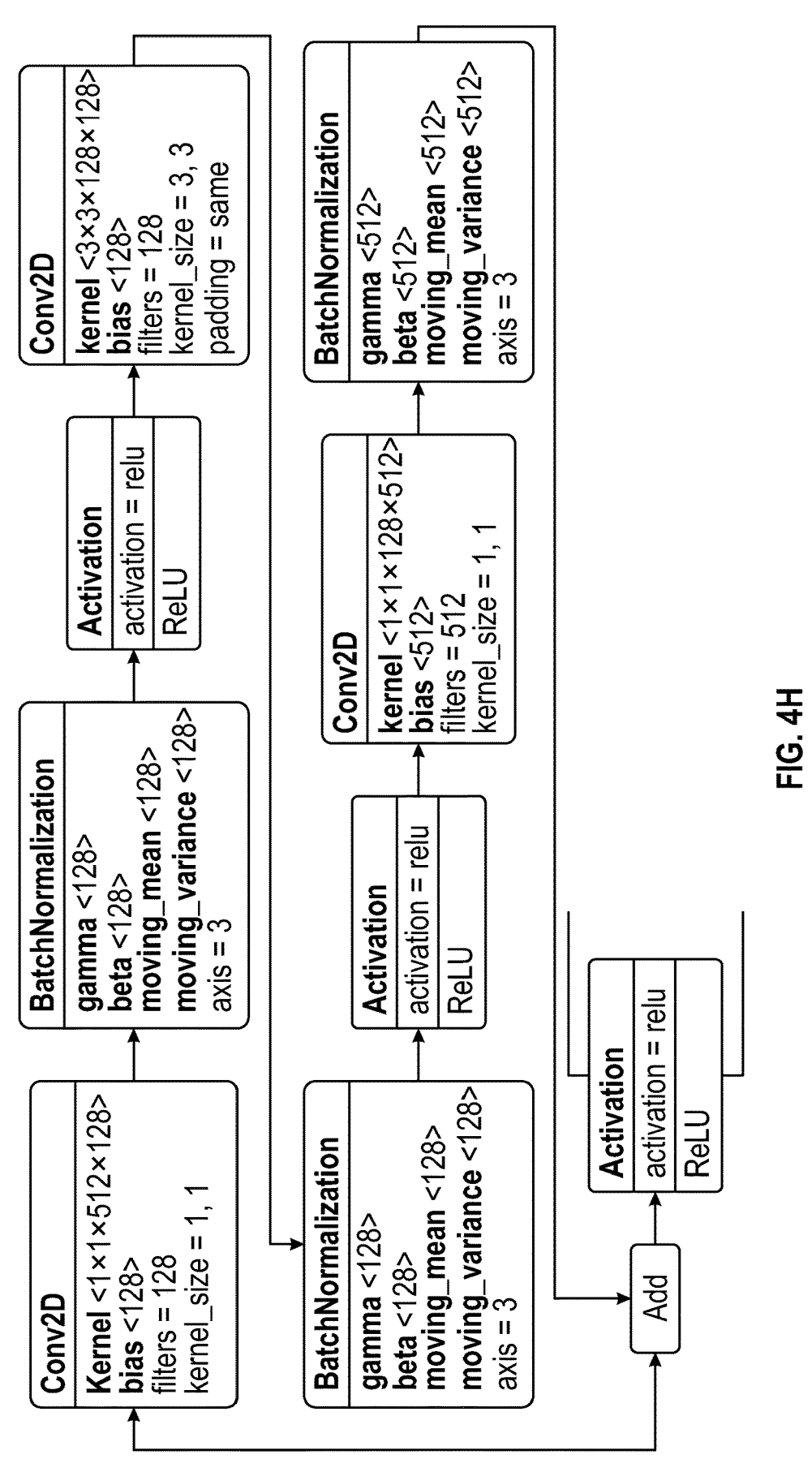
Figure 4I:
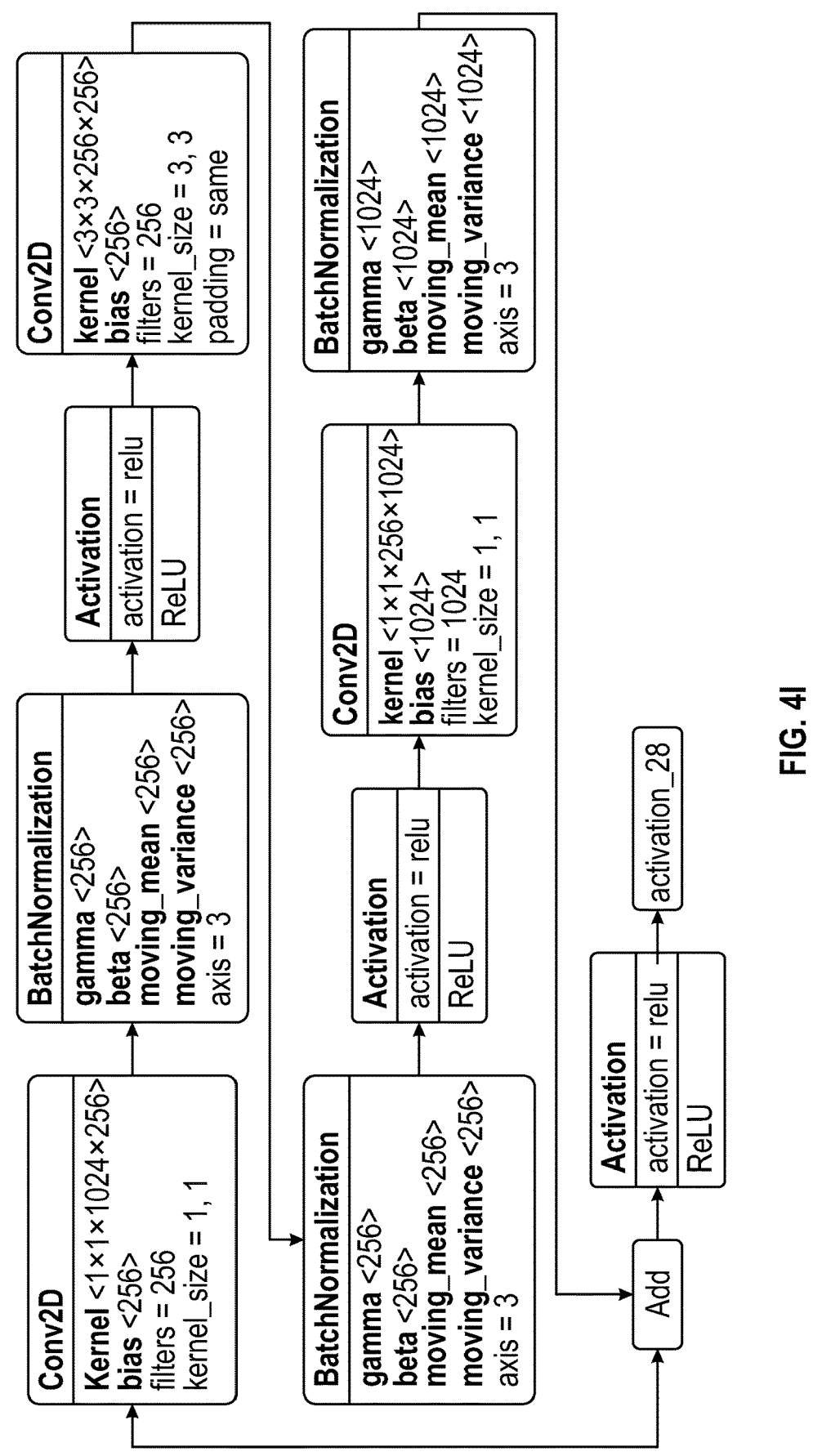
Figure 4J:
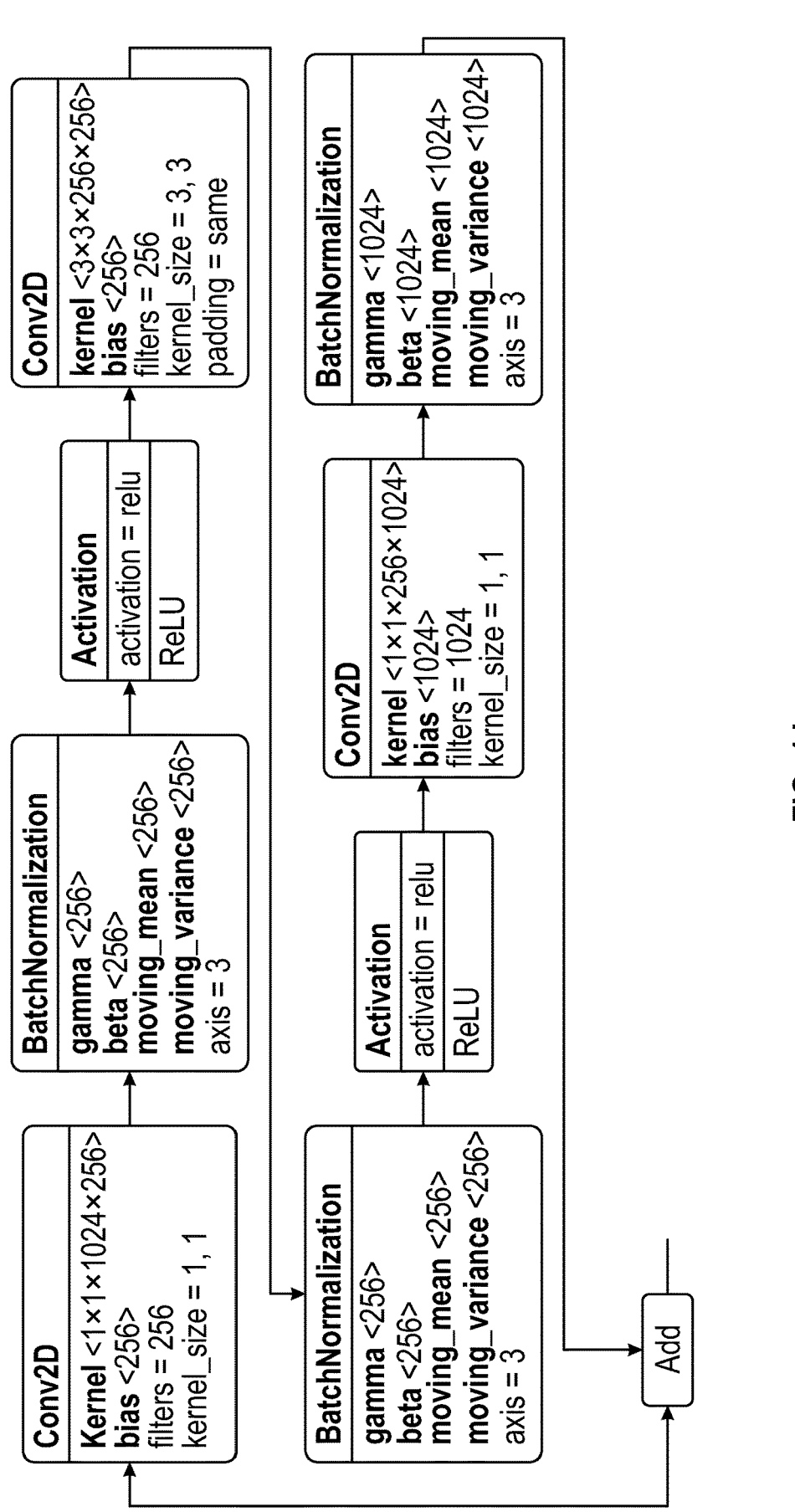

FIG. 3 illustrates overall layout of the processing in FIG. 2 and FIGS. 5A and 5B by depicting, in greater details, certain aspects of the training processing to identify which layers of the first model are saved and utilized with the additional step depicting a transformation of activation maps into a one dimensional array of resized image size. In other words, a resized image 302 is provided for evaluation for the top areas within the resized image where noise is most likely to appear. A first network 304 represents a cropped version of neural network pre trained on a dataset and consisting of the first 2 blocks which has then also been tuned on an internal image dataset using transfer learning techniques. As output from the first network, a activation layer 306 is output represents all the down-samples of original image input up to this point with specific number of dimensions, with each dimension specializing in finding select patterns that help the network classify images for however many classes it was trained to recognize. A weight layer 307 shows a last layer with weights for each class before prediction and where the number of dimension corresponds to the number of classes to be predicted. Extracted weights 308 show the extraction of weights for one specific class in question, which in this case represents noise. The other weights in this case give the opposite results to noise weights. An array 308 represents a calculation of arrays with variable dimensions from extracted weights 308 and activation layer 306 into one-dimensional array in the shape of resized image with top activations remapped to image shape and highlighted by higher numbers within resulting array. FIG. 314 showcases the process of reshaping top activated one dimensional array of resized image size from previous steps to the original non cropped non resized or in any other way pre processed original image shape.

Turning now to FIG. 7 which illustrates the processing for identifying one or more target activation areas in the original image that are to be used to estimate noise. In one embodiment, a target area represents the highest number from one dimensional top activation maps array mapped back to the original image shape or a maximum value in a range of segments of 1 dimensional top activations array vs if such is split into multiple sampling segments. A sample implementation of finding a target area in an image having a maximum value in an array can be seen below given a sample array Another non external library method is depicted below given a sample array:

```
a=np.array([1,2,3,4,5],
          [7,13,34,75,36],
          [23,67,89,12,10]
          ])
```

One can iterate over each row and each value within row representing columns and record maximum value encountered so far. During iteration record current row number by updating row value variable and record column value by updating column value within current row. If current value exceeds previous maximum value then update maximum value with current value and record current row number and current column number as coordinates of current maximum value.

```
rows_count = 0
max_col = 0
max_row = 0
max_val = 0
For x in a:
    rows_count += 1
    columns_count = 0
    For y in x:
        columns_count += 1
        if y > max_val:
            max_val = y
            max_col = columns_count
            max_row = rows_count
```

The above algorithm results in the following outputs:

```
max_col = 3
max_row = 3
max_val = 89
```

In different interpretations one may label max_col to be x coordinate and max_row as y coordinate.

After X and Y coordinates are located they are divided by an original size of width and length corresponding to each X and Y coordinates (depending on original orientation X can be divided by length or width and same goes for Y coordinate) in order to obtain these coordinates in original image size. A bounding box of a predetermined size is generated then cropped from original image, with rescaled X & Y coordinates at the center position of the generated bounding box.

Figure 8:
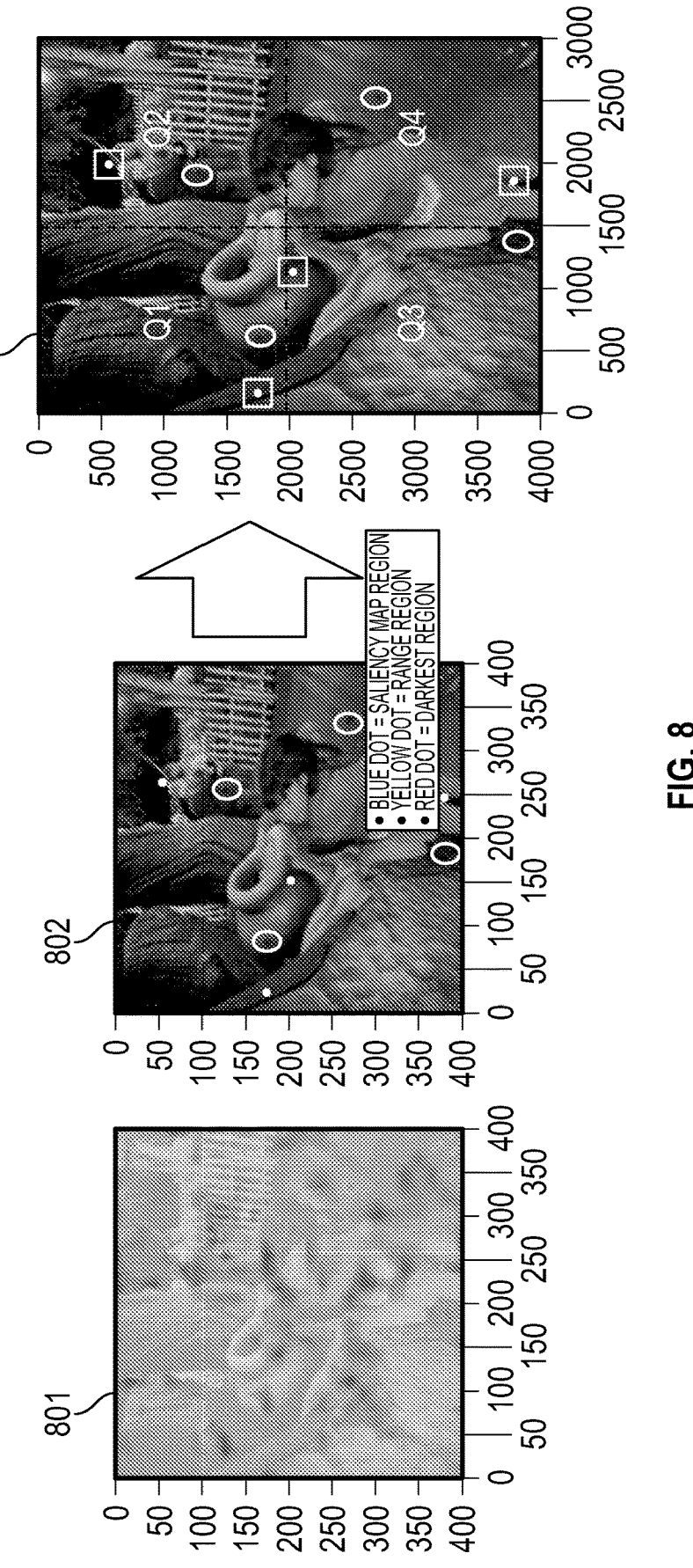
FIG. 8 illustrates the activation maps of an image being evaluated by the algorithm according to the present disclosure.

FIG. 8 shows mapped activation maps overlayed over resized image 801 with top activation maps regions shown in the circles of in the middle image 802 which are present in each quarter of image depicted by blue dot. The final image 803, is the original image, with coordinates from resized image rescaled back to original image size and then bounding boxes (illustrated as circles in image 803) are also depicted with detected coordinates as their center. The illustration as circle is to emphasize the location. However, the dots at the substantially center point of image 803 are surrounded by a bounding box having a predetermined height and width with the detected coordinates from FIG. 7 at the center point.

Figure 9:
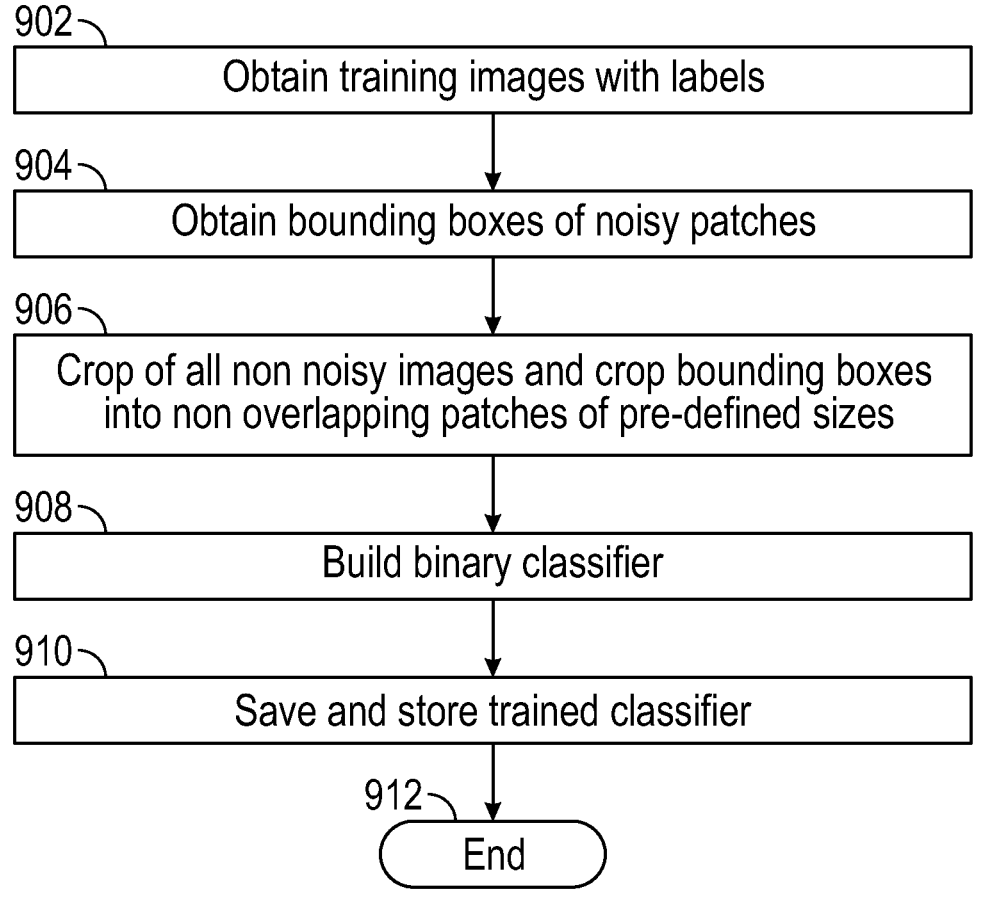
FIG. 9 is a flow diagram of an algorithm for training a classifier used in accordance with image scoring algorithm of the present disclosure.
Figure 10A:
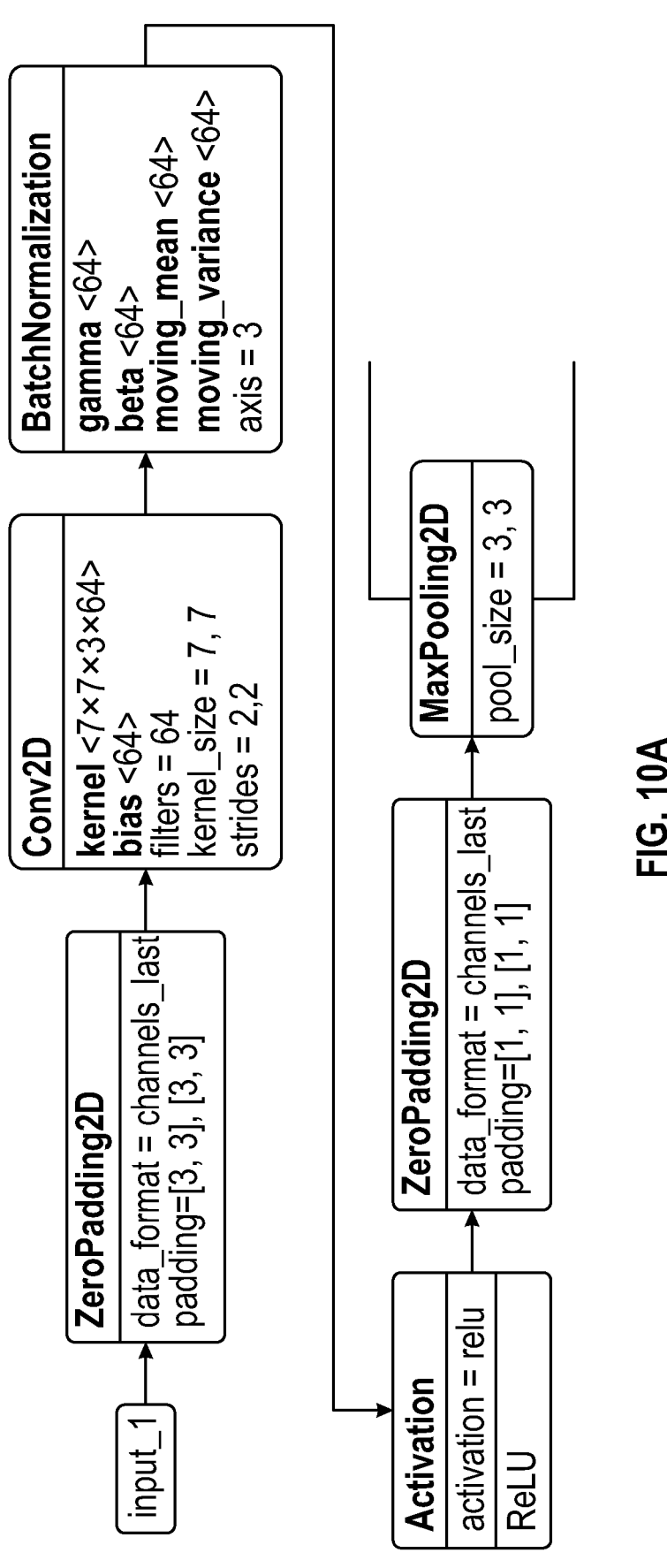
FIGS. 10A-10K illustrate the model generated by the training algorithm of FIG. 9.
Figure 10B:
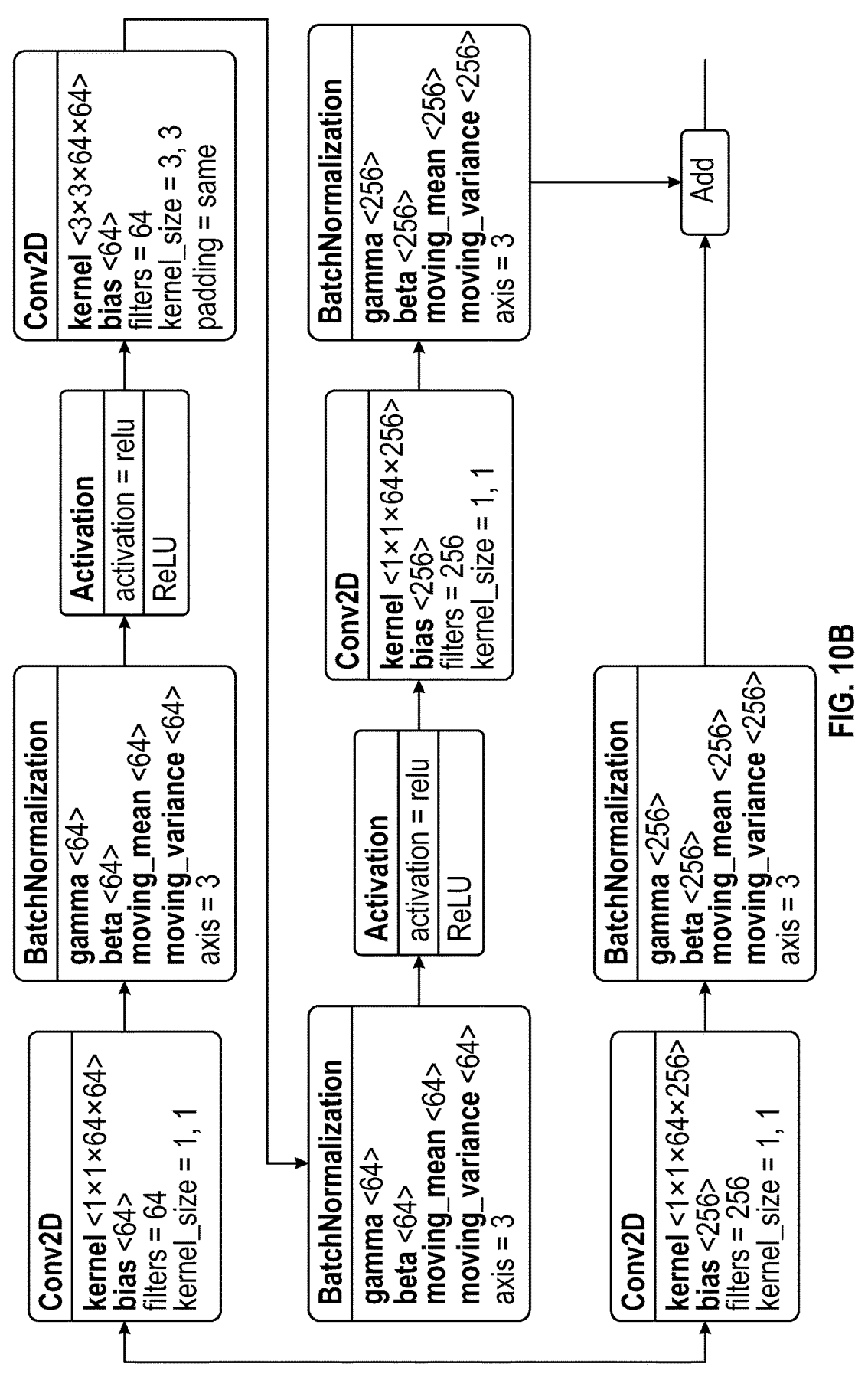
Figure 10C:
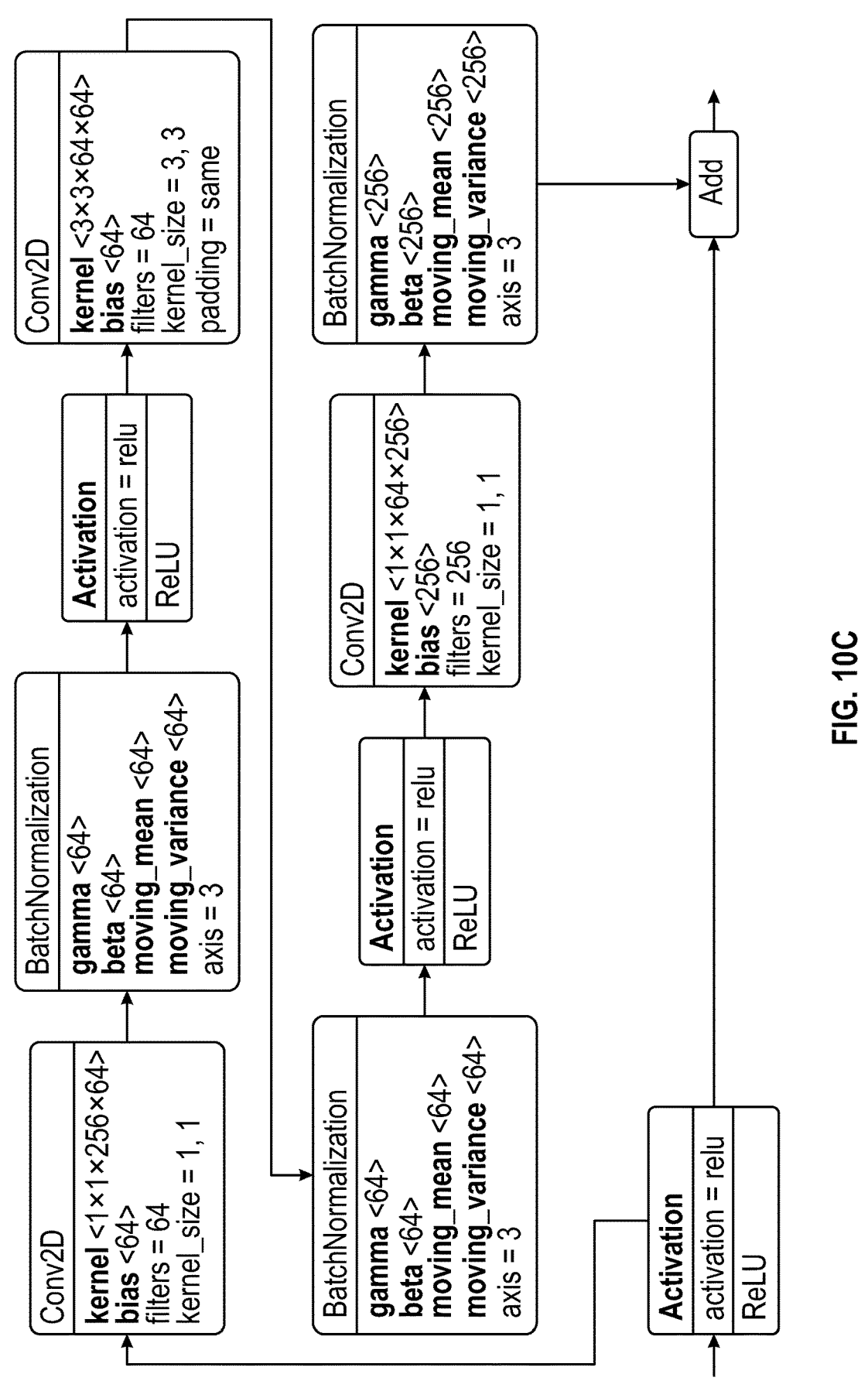
Figure 10D:
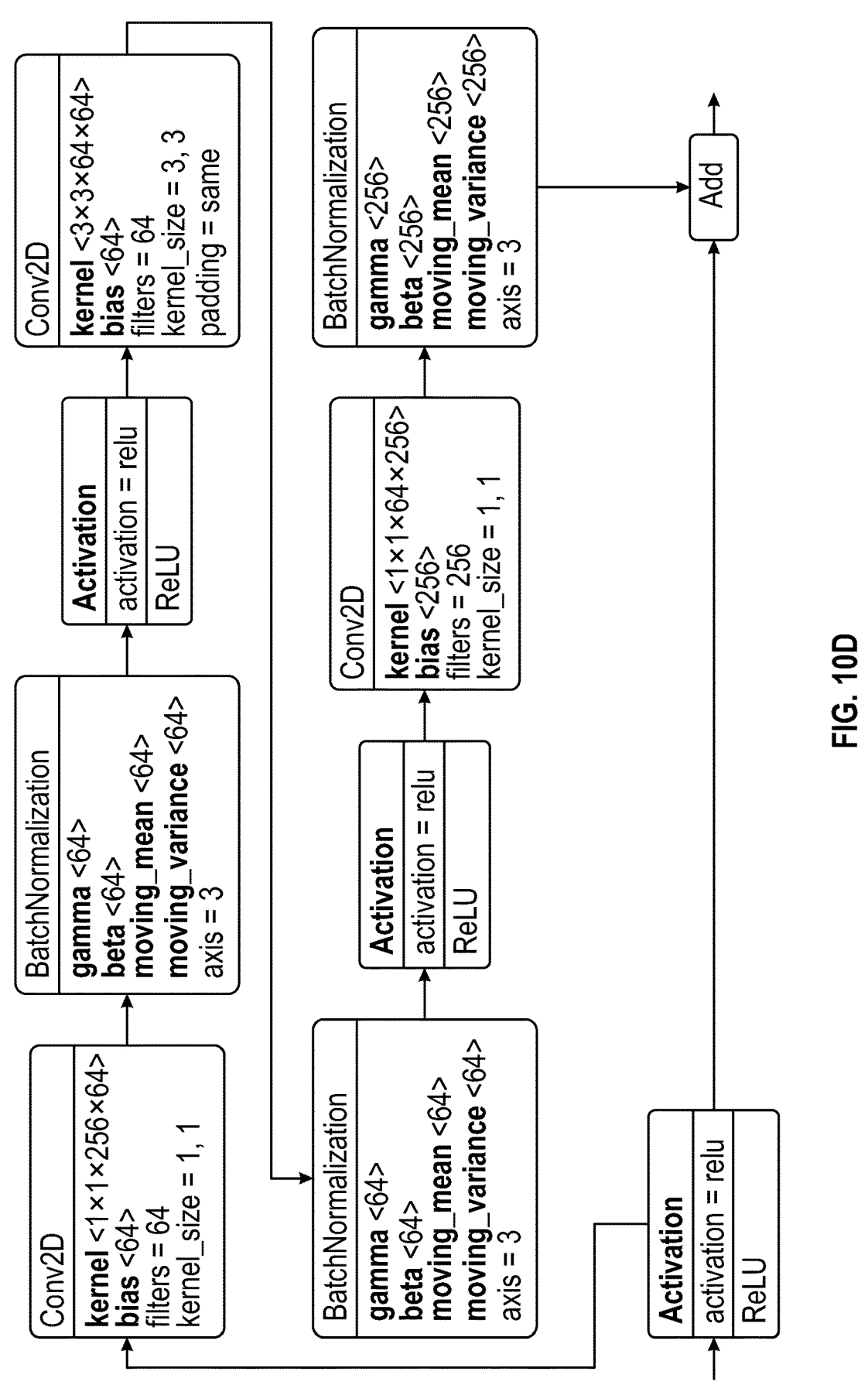
Figure 10E:
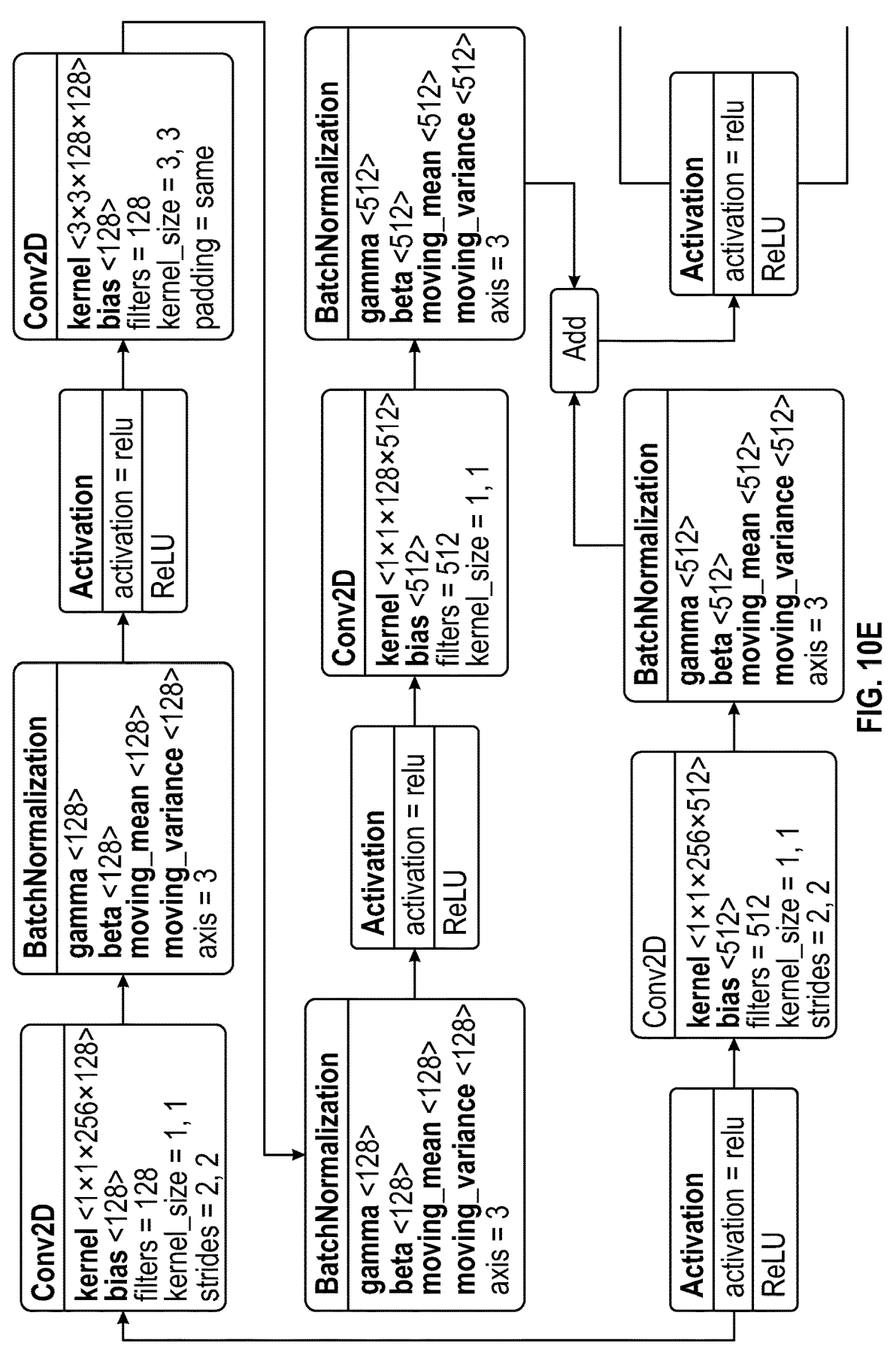
Figure 10F:
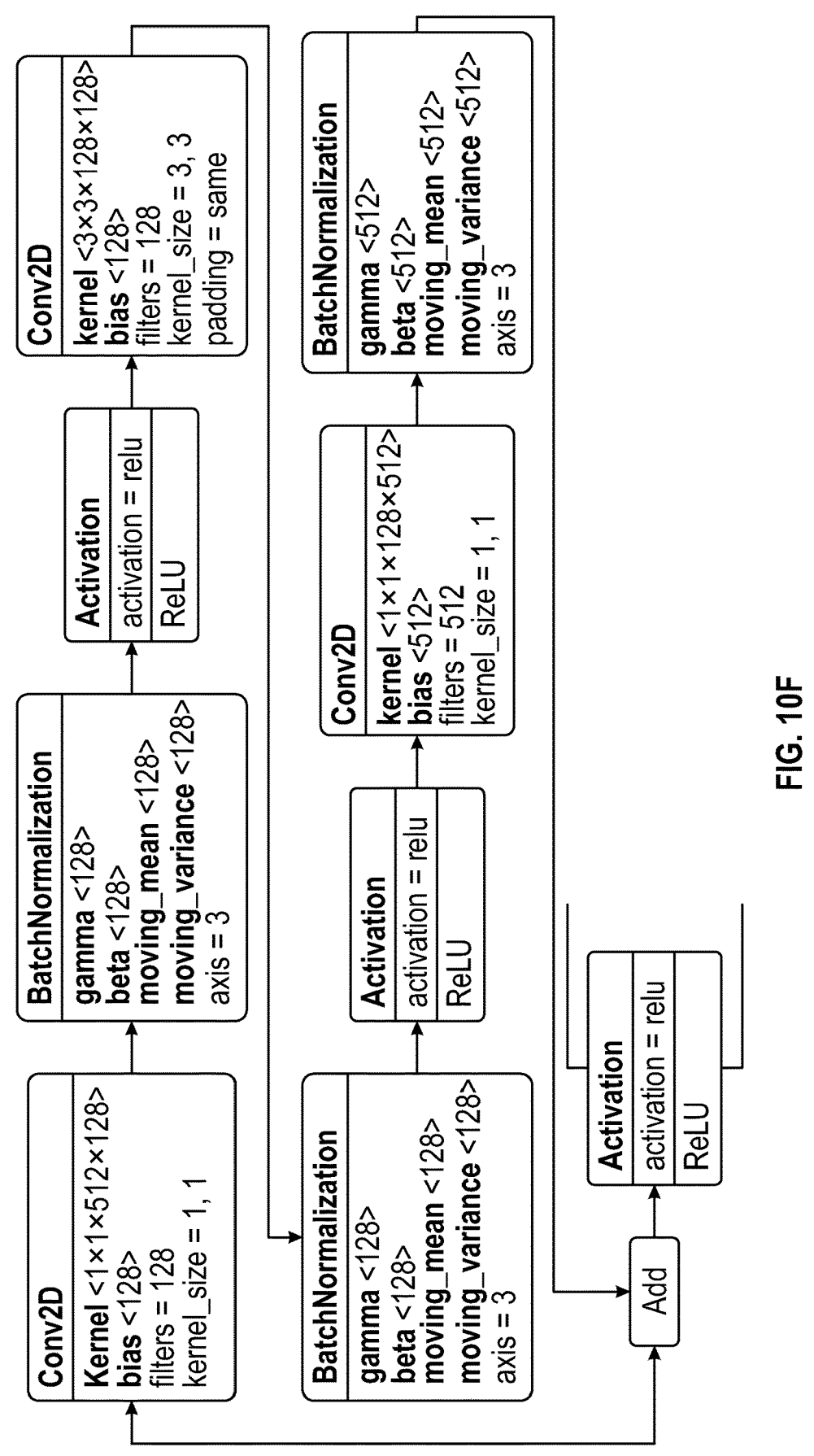
Figure 10G:
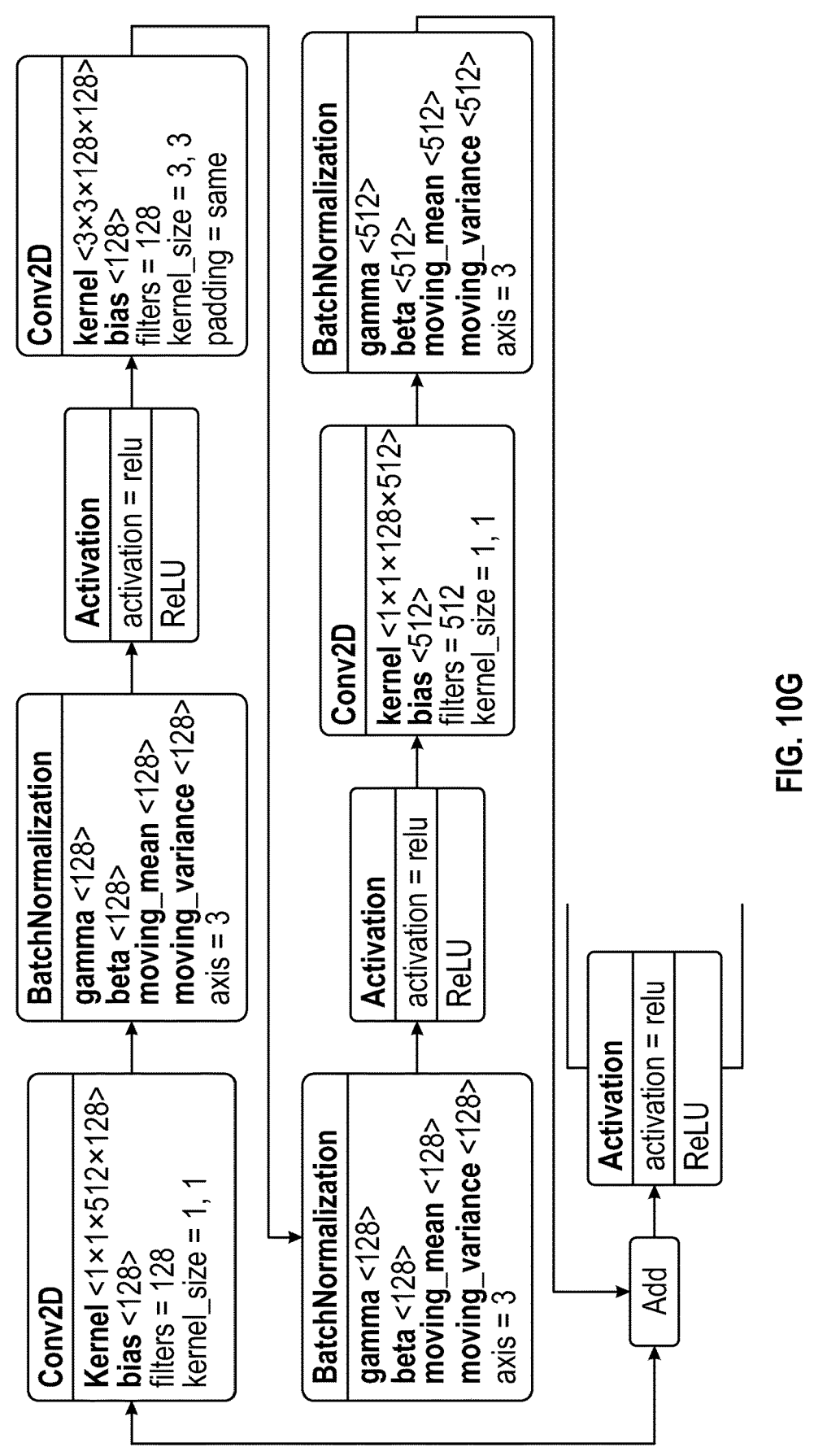
Figure 10H:
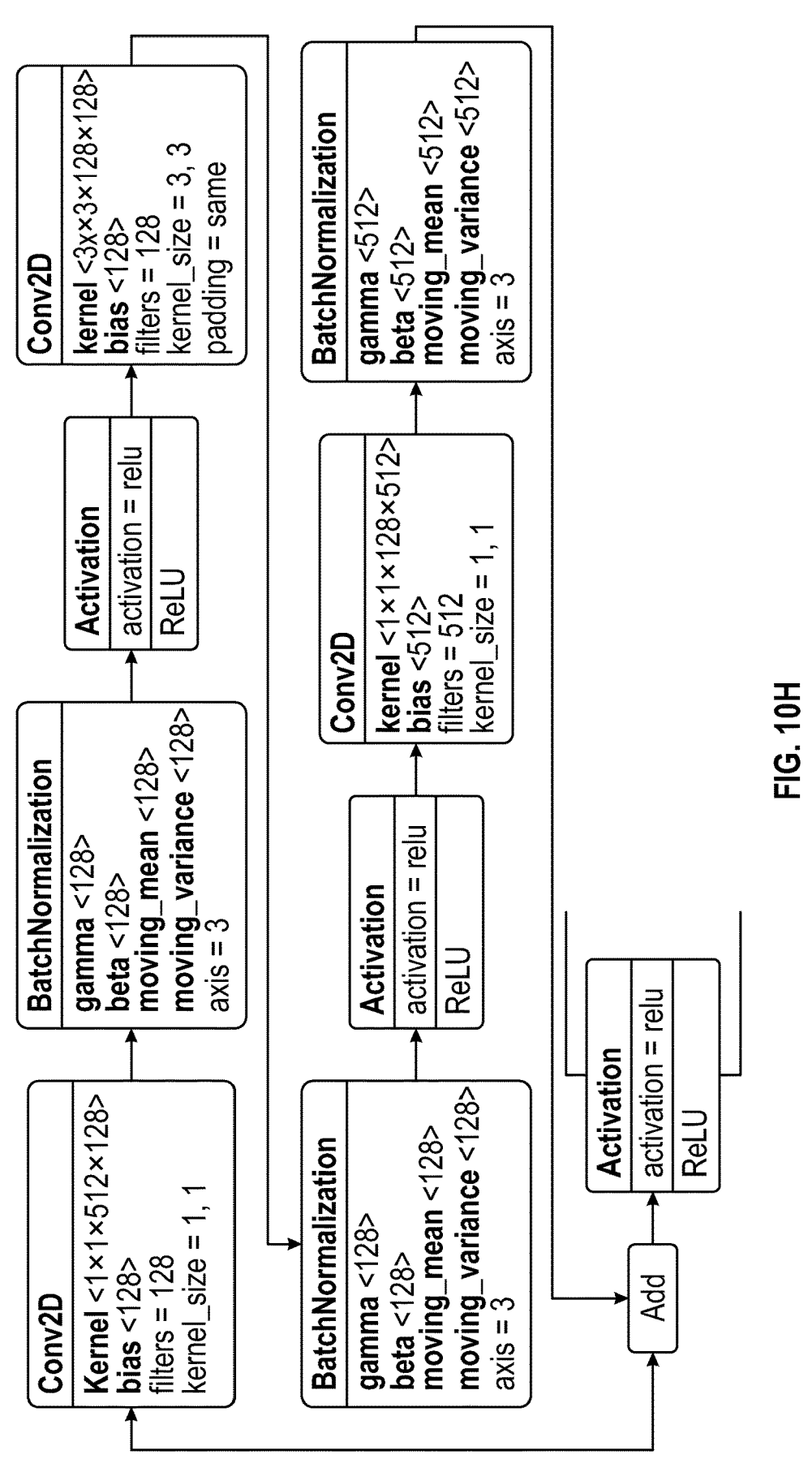
Figure 10I:
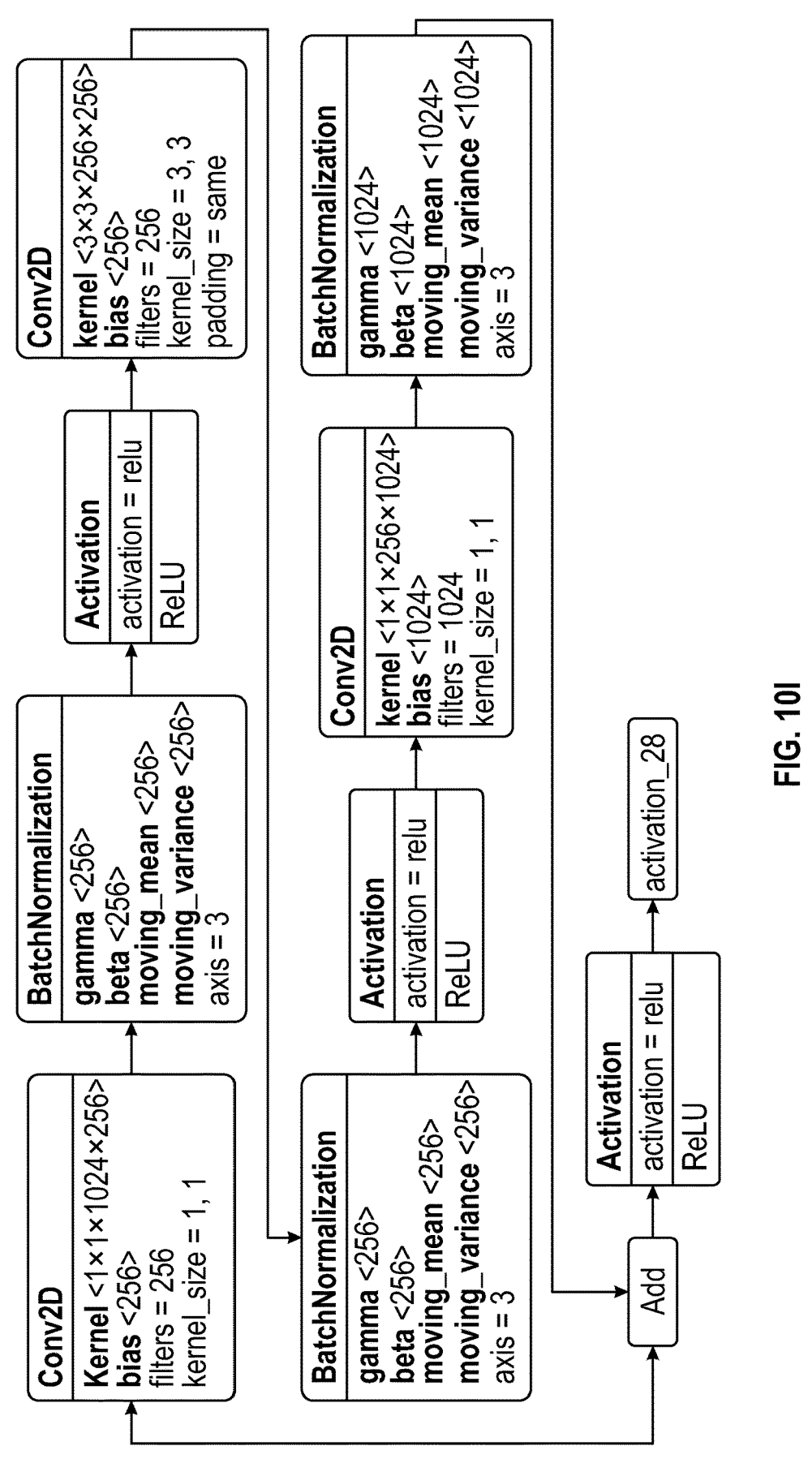
Figure 10J:
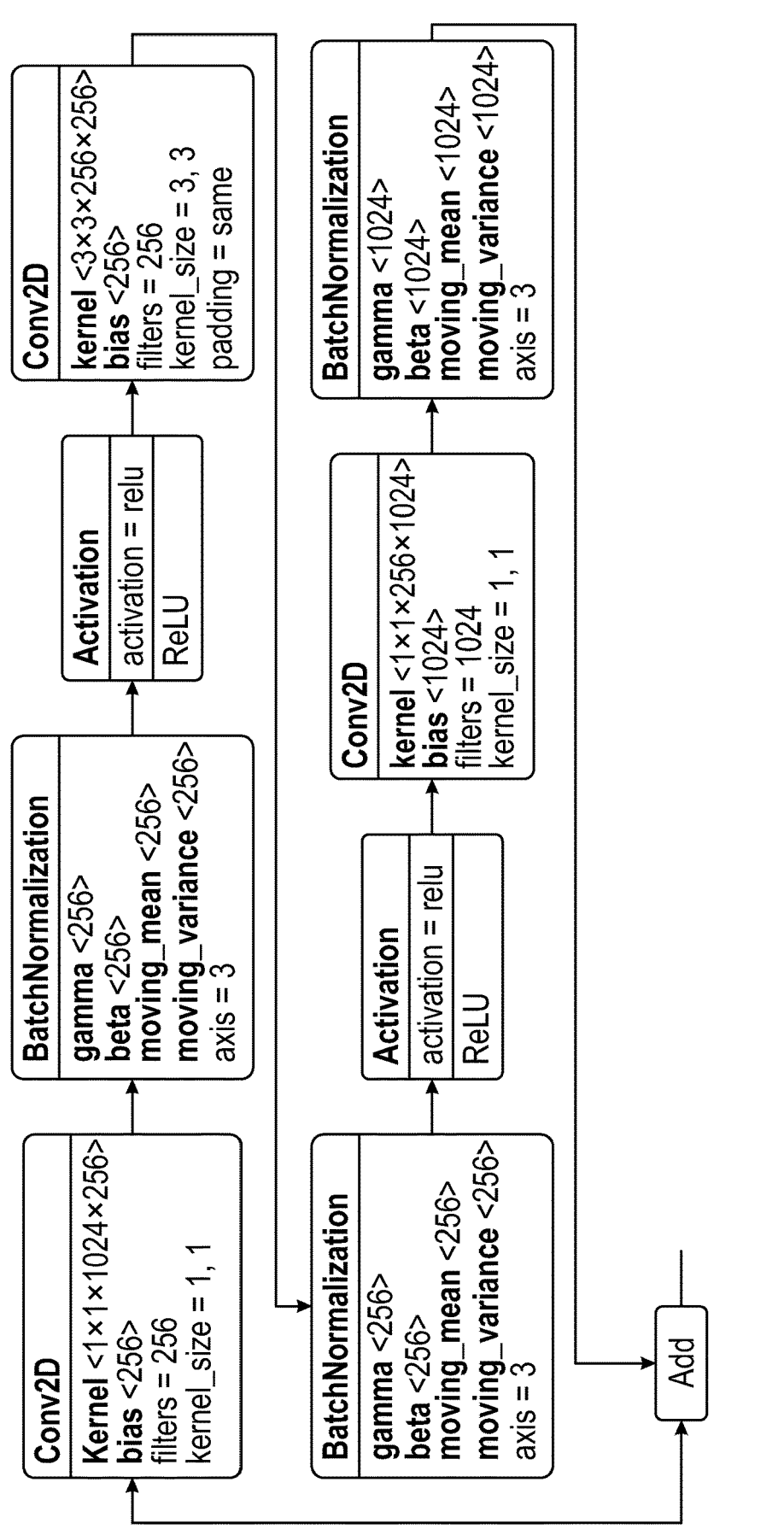
Figure 10K:
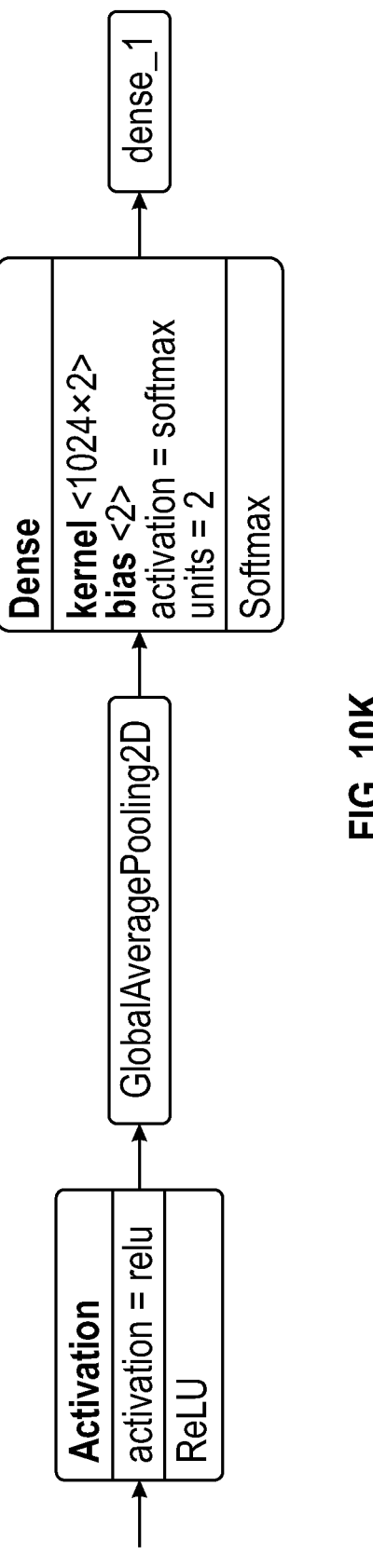

FIG. 9 illustrates an algorithm for training a classifier in order to be able to predict noise in an image. In step 902, training images that are labeled as noisy and non-noisy are obtained. In step 904, bounding boxes are obtained from multiple experts with X & Y coordinates in noisy images in order to focus only on noisy parts. In step 906, all areas of non-noisy images and image data within the bounding boxes of the noisy images are cropped into non overlapping patches of predetermined size taken for use in building the classifier in step 908. Each patch is then relabeled according to its class: noisy or non-noisy. Binary classifier uses transfer-learning training technique and consist of first 28 layers/ first 2 blocks of a model pre trained on a predetermined dataset of images with global average pooling layer and a dense layer with 2 softmax units added in order to allow the model to classify between two classes. Since noise is typically of random patterns, the first few blocks of the model with high level features are able to estimate noise patterns. Thereafter, all batch normalization layers are unfrozen (technique, which has proved to increase model accuracy) and last added layers described above for training, what is at this stage, is a fully convolutional classifier. The trained classifier is then stored in memory in step S910. FIGS. 10A-10K shows final layout of the model. FIG. 11 shows difference in training only last added layers vs training last added layers and batch normalization layers only with everything else frozen:

Total params: 4,104,006
Trainable params: 20,354
Non-trainable params: 4,083,712

Figure 11A:
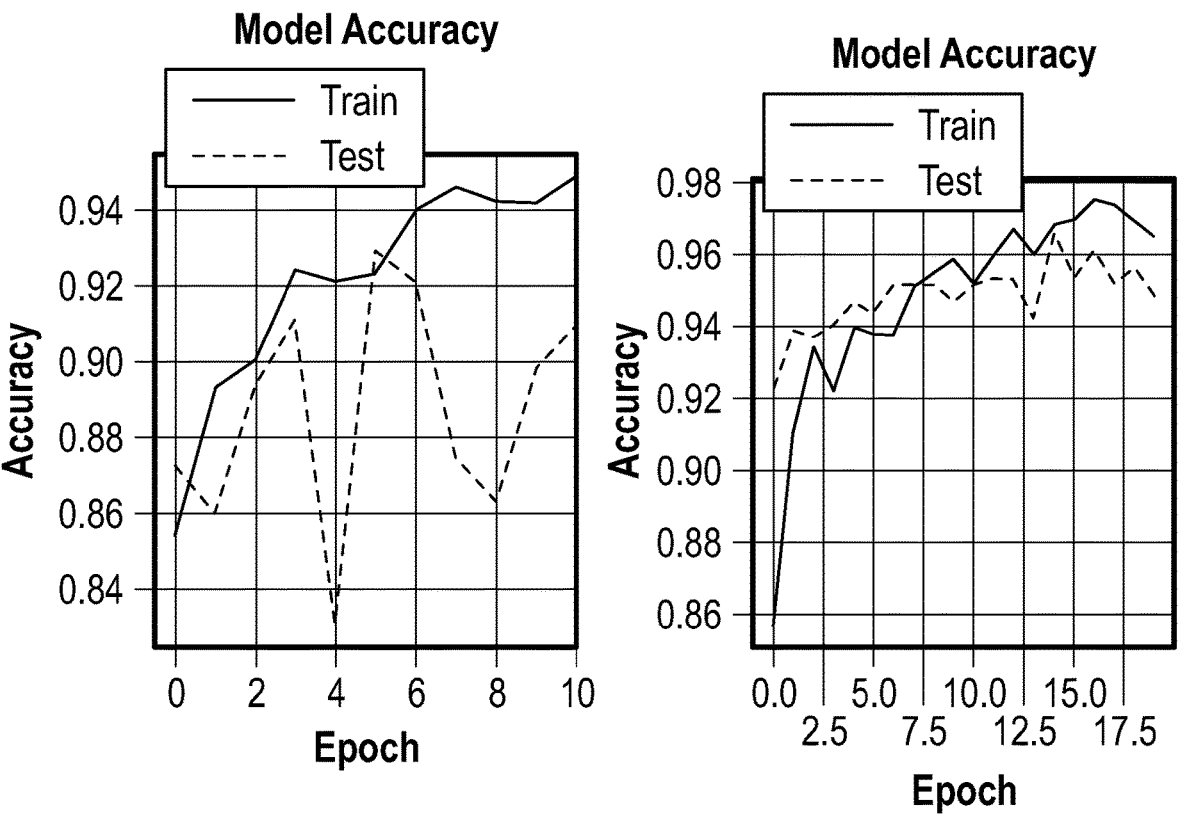
FIGS. 11A-11B are graphical representations of the training accuracy associated with the models according to the present disclosure.
Figure 11B:
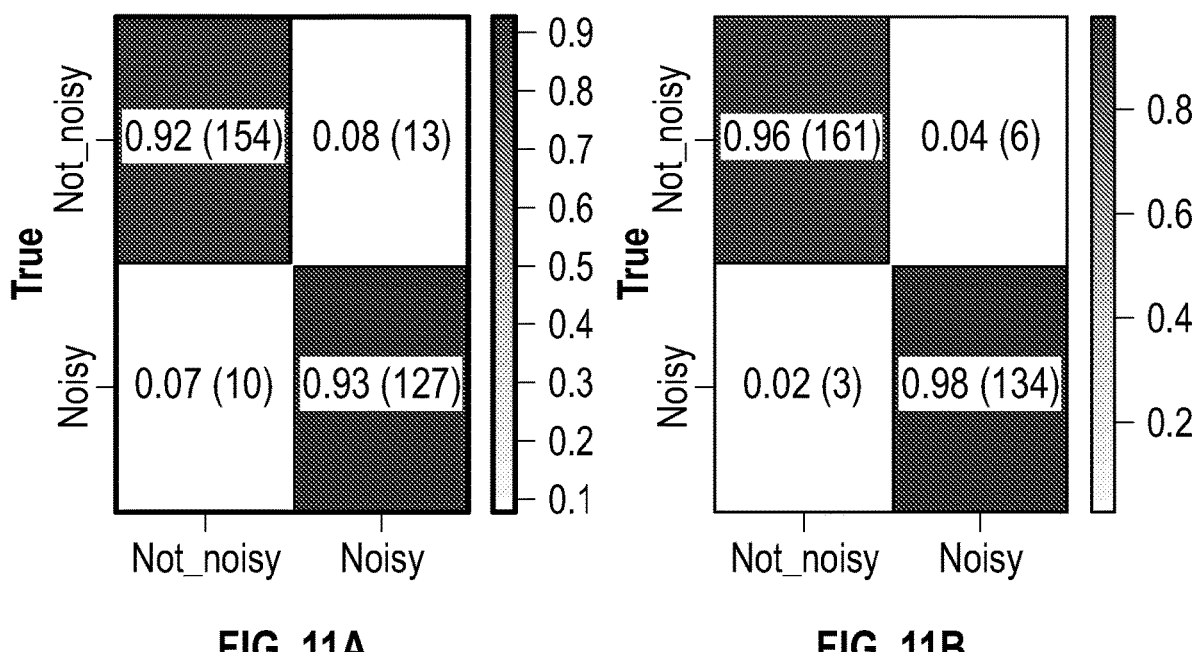

As can be seen in FIG. 11, the resulting accuracy from the trained model according to FIG. 9 which includes the batch normalization (FIG. 11B) results in an accuracy that is higher than that of the model without the batch normalization (FIG. 11A) based on two confusion matrixes with FIG. 11B showing less false positive and false negatives when compare to FIG. 11A. The present described algorithm results in the model more accurately classifying images as non-noisy and images that are noisy as compared to prior classifiers for example one trained on resized images with confusion matrix of such in FIG. 6.

Figure 12A:
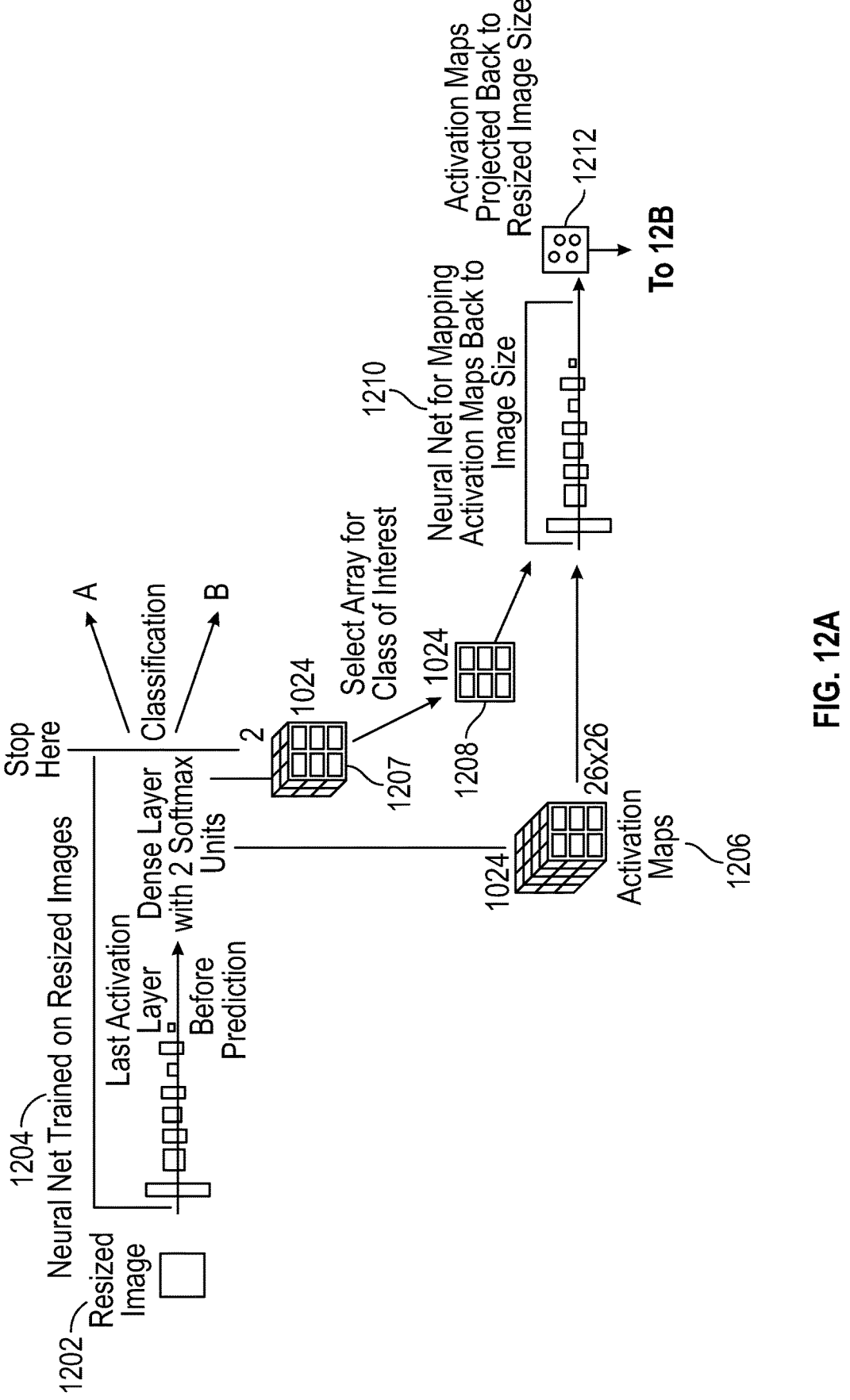
FIGS. 12A-12B are an illustrative view of the image scoring algorithm of the present disclosure.
Figure 12B:
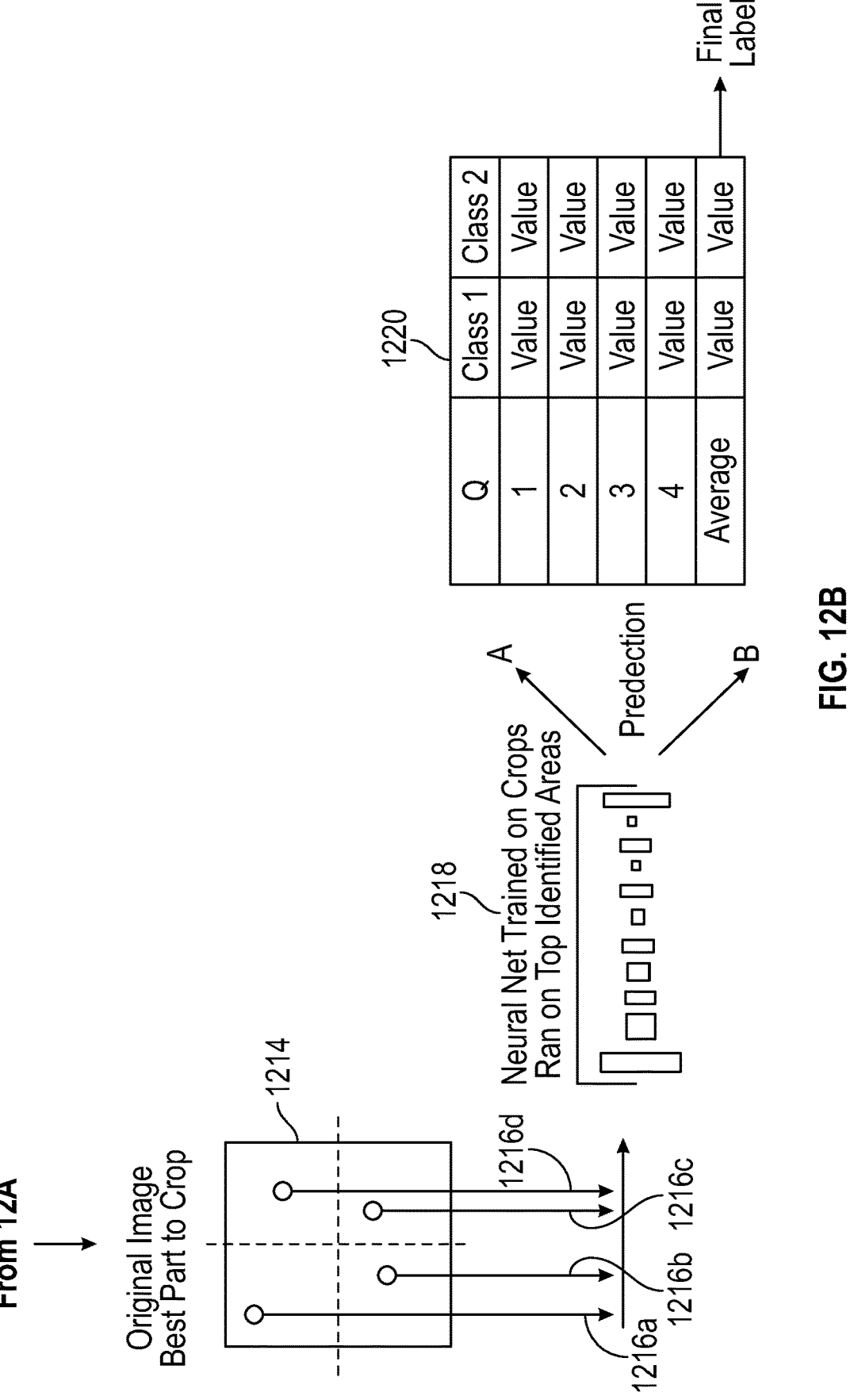
Figures 13A, 13B, 13C:
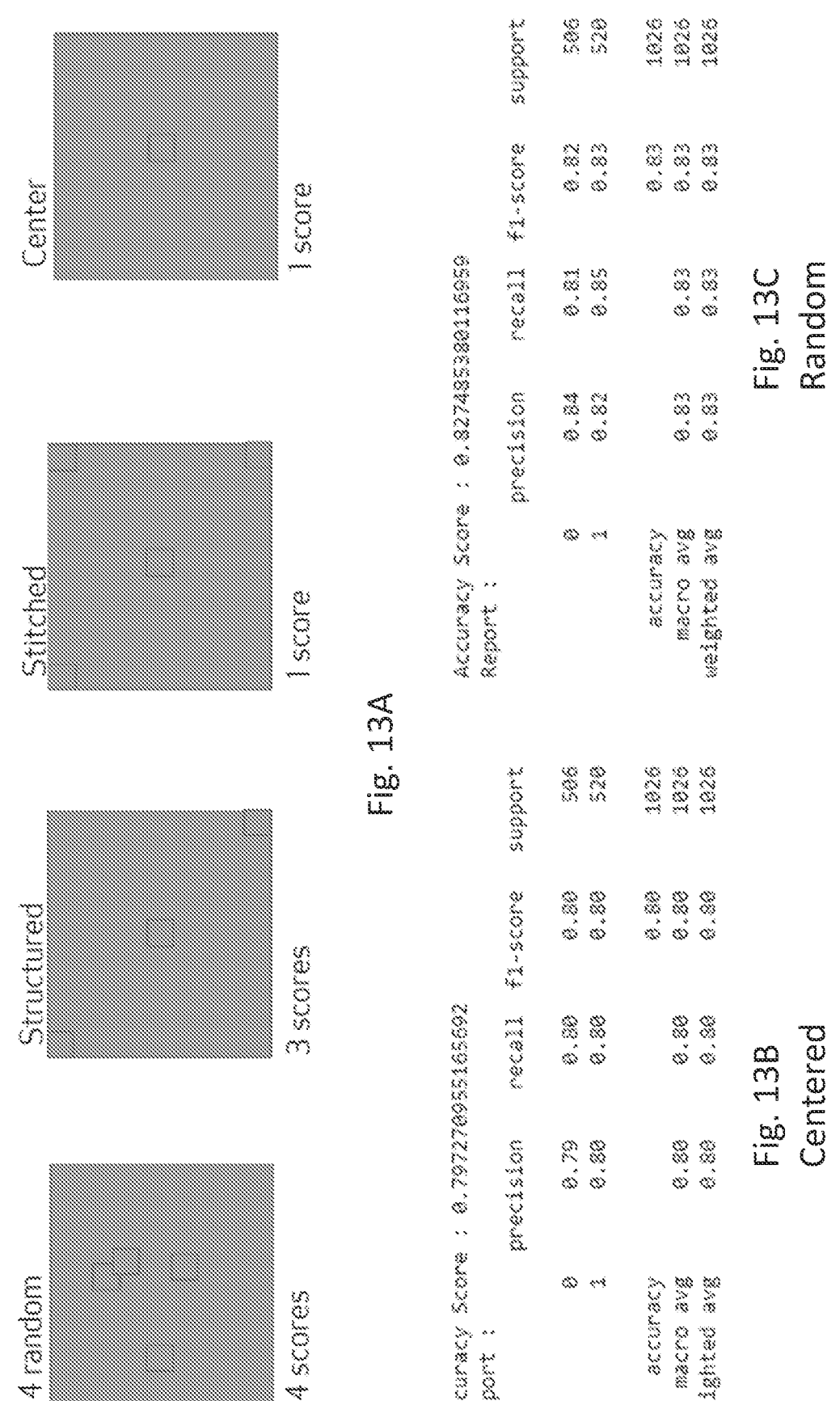

FIGS. 12A-12B shows end to end process combining all of the algorithms described above. One or more images 1202 are provided as input to a first convolutional neural network 1204 that was trained to recognize noise in resized images. The first network is structured to have its top layer removed in order to output activation maps data 1206 instead of class probabilities. Elements 1206, 1207 and 1207 correspond to elements 306, 307 and 308 in FIG. 3, the description of which is incorporated herein by reference and need not be repeated.

A second neural network 1210 remaps activation maps to a one dimensional array of resized image size using activation map data 1206 and image array data 1208 corresponding to the image being analyzed. The second network 1210 uses the activation map data and image array data to output target areas 1212 in the original resized image input into the first network where the target areas represent top/maximum values. Continuing now to FIG. 12B, the target areas are then transformed and scaled back to the original size of the image 1214 to identify X and Y coordinates in each quadrant of the time original image 1214 corresponding to the target areas 1212 (shown as circles in FIG. 12B). Bounding boxes are formed with the target area at substantially a center point thereof and are cropped to produce cropped image data 1216a-1216d. Each of the image data from within the bounding boxes 1216a-1216d are provided as input to a third convolutional neural network 1218 that has been trained on noisy and non-noisy patches from non resized images. A prediction table 1220 is generated identifying a location in the image by quadrant and whether the cropped image data in that quadrant predicts the image to be noisy or not noisy. An average is taken for each class predicted and final label of what class the image belongs to, noise or non-noise is obtained based on the calculated average as compared to optimal probability threshold calculated using ROC AUC curve where the optimal cut off represents the highest true positive and the lowest false positive rates FIG. 13A-13F shows performance of model on an internal validation dataset and validates better accuracy of model using activation maps areas approach vs other approaches one may use to extract areas from an image to detect noise. Across all different sampling methods activation maps method significantly outperformed all other methods judging by weighted average precision, recall and f1 score metrics.

Figure 14:
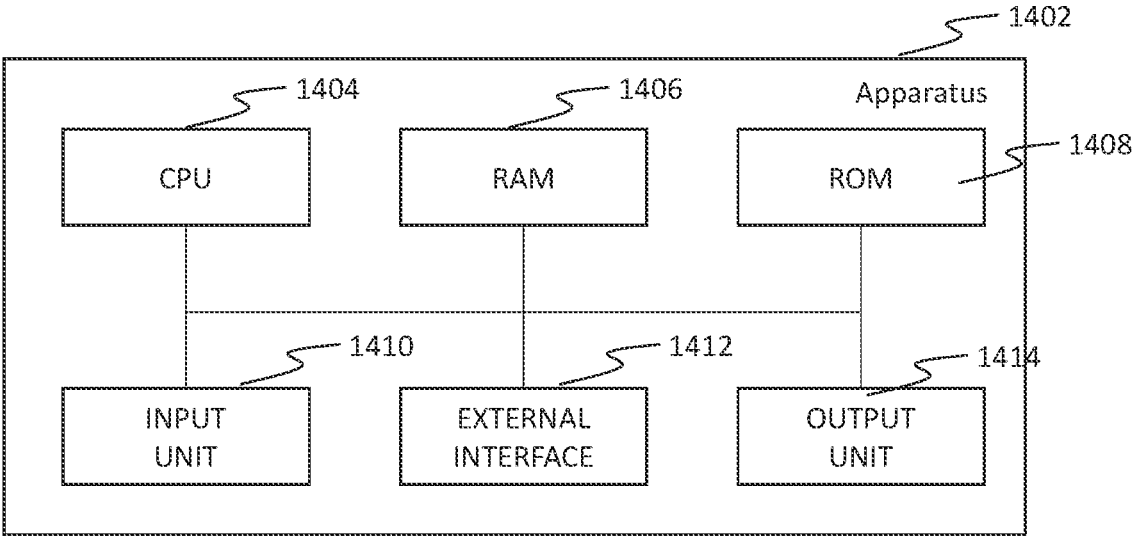
FIG. 14 is a block diagram detailing the hardware components of an apparatus that executes the algorithm according to the present disclosure.

FIG. 14 illustrates the hardware of an apparatus that can be used in implementing the above described disclosure. The apparatus 1402 includes a CPU 1404, a RAM 1406, a ROM 1408, an input unit 1410, an external interface 1412, and an output unit 1414. The CPU 1404 controls the apparatus 1402 by using a computer program (one or more series of stored instructions executable by the CPU) and data stored in the RAM 1406 or ROM 1408. Here, the apparatus may include one or more dedicated hardware or a graphics processing unit (GPU), which is different from the CPU 1404, and the GPU or the dedicated hardware may perform a part of the processes by the CPU 1404. As an example of the dedicated hardware, there are an application specific integrated circuit (ASIC), a field-programmable gate array (FPGA), and a digital signal processor (DSP), and the like. The RAM 1406 temporarily stores the computer program or data read from the ROM 1408, data supplied from outside via the external interface 1412, and the like. The ROM 1408 stores the computer program and data which do not need to be modified and which can control the base operation of the apparatus. The input unit 1410 is composed of, for example, a joystick, a jog dial, a touch panel, a keyboard, a mouse, or the like, and receives user's operation, and inputs various instructions to the CPU 1404. The external interface 1412 communicates with external device such as PC, smartphone, camera and the like. The communication with the external devices may be performed by wire using a local area network (LAN) cable, a serial digital interface (SDI) cable, WIFI connection or the like, or may be performed wirelessly via an antenna. The output unit 1414 is composed of, for example, a display unit such as a display and a sound output unit such as a speaker, and displays a graphical user interface (GUI) and outputs a guiding sound so that the user can operate the apparatus as needed.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

The use of the terms "a" and "an" and "the" and similar referents in the context of this disclosure describing one or more aspects of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter disclosed herein and does not pose a limitation on the scope of any invention derived from the disclosure unless otherwise claimed. No language in the specification should be construed as indicating any non-claimed element as essential.

It will be appreciated that the instant disclosure can be incorporated in the form of a variety of embodiments, only a few of which are disclosed herein. Variations of those embodiments may become apparent to those of ordinary skill in the art upon reading the foregoing description. Accordingly, this disclosure and any invention derived therefrom includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. An image processing method comprising:
obtaining image data stored in memory of a processing device;
providing the image data at a first scale as input to a first classifier, the first classifier being trained based on images in the first scale to classify the image data in a first class or a second class;
outputting, from the first classifier, activation map data and image array data;
obtaining at least one target region of the image data at the first scale based on output of a second classifier that uses the activation map data and image array data from the first classifier;
mapping the at least one target region to image data at a second scale;
extracting target region image data from each of the at least one target region of the image data at the second scale;
classifying, as a first type of image or a second type of image, the obtained image data based on the extracted target region image data using a third classifier trained using cropped image data at the second scale to estimate noise.

2. The image processing method according to claim 1 wherein the classifying, as a first type or second type of image is performed by
calculating an average by predicted class of each of the at least one target regions over an entire area of the obtained image data; and
labeling the obtained image data as the first type or second type based on the calculated average.

3. The image processing method of claim 1, wherein obtaining at least one target region further comprises identifying coordinate locations within the obtained image data based on the image array data and the activation map such that each of the target region represents a maximum value.

4. The image processing method of claim 3, wherein extracting target region image data further comprises:
using each of the identified coordinate locations as a center point; and
generating a bounding box having a predetermine size around each center point; and
extracting, as the target region image data, the image data within each generated bounding box.

5. The image processing method of claim 1, further comprising
outputting, on a display, the obtained image data including the label identifying the image as the first type of image or the second type of image.

6. The image processing method of claim 5, wherein the first type of image is an image classified as noisy and the second type of image is an image classified as non-noisy.

7. An image processing apparatus comprising:
one or more memories storing instructions; and
one or more processors that, upon execution of the instructions, is configured to perform operations including:
obtaining image data stored in memory of a processing device;
providing the image data at a first scale as input to a first classifier, the first classifier being trained based on images in the first scale to classify the image data in a first class or a second class;
outputting, from the first classifier, activation map data and image array data;
obtaining at least one target region of the image data at the first scale based on output of a second classifier that uses the activation map data and image array data from the first classifier;
mapping the at least one target region to image data at a second scale;
extracting target region image data from each of the at least one target region of the image data at the second scale;
classifying, as a first type of image or a second type of image, the obtained image data based on the extracted target region image data using a third classifier trained using cropped image data at the second scale to estimate noise.

8. The image processing apparatus according to claim 7, wherein execution of the instructions further configures the one or more processors to perform operations comprising
classifying, as a first type or second type of image is performed by calculating an average by predicted class of each of the at least one target regions over an entire area of the obtained image data; and
labeling the obtained image data as the first type or second type based on the calculated average.

9. The image processing apparatus of claim 7, wherein execution of the instructions further configures the one or more processors to perform operations comprising
obtaining at least one target region by identifying coordinate locations within the obtained image data based on the image array data and the activation map such that each of the target region represents a maximum value.

10. The image processing apparatus of claim 9, wherein execution of the instructions further configures the one or more processors to perform operations comprising extracting target region image data by:
using each of the identified coordinate locations as a center point; and generating a bounding box having a predetermine size around each center point; and extracting, as the target region image data, the image data within each generated bounding box.

11. The image processing apparatus of claim 7, wherein execution of the instructions further configures the one or more processors to perform operations comprising outputting, on a display, the obtained image data including the label identifying the image as the first type of image or the second type of image.

12. The image processing apparatus of claim 11, wherein the first type of image is an image classified as noisy and the second type of image is an image classified as non-noisy.

* * * * *